(12) United States Patent
Oota et al.

(10) Patent No.: US 11,801,667 B2
(45) Date of Patent: Oct. 31, 2023

(54) THERMOPLASTIC FILM AND LAMINATED GLASS

(71) Applicant: SEKISUI CHEMICAL CO., LTD., Osaka (JP)

(72) Inventors: Yuusuke Oota, Moriyama (JP); Kinryou Chou, Kusatsu (JP); Daisuke Nakajima, Land Nordrhein-Westfalen (DE); Takanori Hamada, Koka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 169 days.

(21) Appl. No.: 17/439,192

(22) PCT Filed: Mar. 19, 2020

(86) PCT No.: PCT/JP2020/012513
§ 371 (c)(1),
(2) Date: Sep. 14, 2021

(87) PCT Pub. No.: WO2020/189784
PCT Pub. Date: Sep. 24, 2020

(65) Prior Publication Data
US 2022/0152992 A1 May 19, 2022

(30) Foreign Application Priority Data
Mar. 20, 2019 (JP) .................................. 2019-053906

(51) Int. Cl.
B32B 15/04 (2006.01)
B32B 17/06 (2006.01)
B32B 17/10 (2006.01)

(52) U.S. Cl.
CPC ........ *B32B 17/10669* (2013.01); *B32B 17/10* (2013.01); *B32B 17/10036* (2013.01);
(Continued)

(58) Field of Classification Search
CPC ........ B32B 17/10669; B32B 17/10036; B32B 17/10633
(Continued)

(56) References Cited

U.S. PATENT DOCUMENTS

| 3,441,361 A | 4/1969 | Tocatlian |
| 10,179,442 B2 | 1/2019 | Keller et al. |

(Continued)

FOREIGN PATENT DOCUMENTS

| CN | 106164008 | 11/2016 |
| EP | 3 239 113 | 11/2017 |

(Continued)

OTHER PUBLICATIONS

International Search Report dated Jun. 9, 2020, in International (PCT) Application No. PCT/JP2020/012513, with English translation.

*Primary Examiner* — Lauren R Colgan
(74) *Attorney, Agent, or Firm* — Wenderoth, Lind & Ponack, L.L.P.

(57) ABSTRACT

A thermoplastic film 10 is a thermoplastic film comprising a light-emitting layer 11, wherein the light-emitting layer 11 comprises a thermoplastic resin and a light-emitting material that emits light by being irradiated with excitation light, and when laminated glass obtained by bonding two sheets of clear glass in accordance with JIS R 3211(1998) having a thickness of 2.5 mm with the thermoplastic film interposed therebetween is irradiated, from one surface, with excitation light, which the light-emitting material is capable of absorbing, in a quantity of light of 7 $mW/cm^2$, a difference between luminance A observed on a side of the one surface and luminance B observed on a side of the other surface, (A–B), is 5 $cd/m^2$ or more. According to the present invention, a thermoplastic film such that when laminated glass is made using the thermoplastic film, information is displayed relatively strongly on one surface, and the information is displayed relatively weakly on the other surface, and a laminated glass comprising this thermoplastic film can be provided.

12 Claims, 3 Drawing Sheets

(52) U.S. Cl.
CPC .. B32B 17/10541 (2013.01); B32B 17/10633 (2013.01); B32B 17/10678 (2013.01); *B32B 2250/03* (2013.01); *B32B 2250/04* (2013.01); *B32B 2250/05* (2013.01); *B32B 2307/412* (2013.01); *B32B 2307/422* (2013.01); *B32B 2457/20* (2013.01); *B32B 2605/006* (2013.01)

(58) Field of Classification Search
USPC .................................................. 428/426, 428
See application file for complete search history.

(56) References Cited

U.S. PATENT DOCUMENTS

| | | | |
|---|---|---|---|
| 10,363,721 B2* | 7/2019 | Tsunoda | B32B 17/10339 |
| 10,562,276 B2* | 2/2020 | Oota | B32B 27/36 |
| 2013/0050983 A1* | 2/2013 | Labrot | G02B 27/01 |
| | | | 428/339 |
| 2017/0001417 A1* | 1/2017 | Oota | B32B 17/10678 |
| 2017/0113441 A1* | 4/2017 | Tsunoda | B32B 17/10651 |
| 2017/0287369 A1* | 10/2017 | Oota | H10K 50/844 |
| 2019/0351655 A1* | 11/2019 | Nakajima | F21V 9/32 |
| 2021/0046737 A1* | 2/2021 | Nohara | B32B 3/26 |

FOREIGN PATENT DOCUMENTS

| | | |
|---|---|---|
| JP | 50-018008 | 6/1975 |
| JP | 03-141138 | 6/1991 |
| JP | 2010-138028 | 6/2010 |
| JP | 2014-024312 | 2/2014 |
| JP | 2016-130861 | 7/2016 |
| JP | 2018-168061 | 11/2018 |
| JP | 2018-177637 | 11/2018 |
| TW | 201439140 | 10/2014 |
| WO | 2016/104592 | 6/2016 |
| WO | 2018/181269 | 10/2018 |

* cited by examiner

THERMOPLASTIC FILM AND LAMINATED GLASS

TECHNICAL FIELD

The present invention relates a thermoplastic film, and a laminated glass comprising a thermoplastic film.

BACKGROUND ART

In the past, a laminated glass obtained by interposing a thermoplastic film comprising a resin component between two glass plates and integrating them has widely been known. The thermoplastic film is formed in many cases with plasticized polyvinyl acetal containing a plasticizer blended in a polyvinyl acetal resin. The laminated glass has widely been used as window glass of vehicles, such as an automobile, airplanes, and buildings because of its safety in that if the laminated glass is broken by receiving external impact, pieces of broken glass hardly scatter.

To a windshield of an automobile or the like, a head-up display (HUD) that displays information necessary for driving, or the like in the same visual field as the windshield is applied in some cases. HUD which allows a driver to visually recognize light from a projector provided in an instrument panel or the like by reflecting the light at a windshield comprising laminated glass and the like has widely been known.

Further, as disclosed in, for example, PTL1, it is known that, in a laminated glass, a thermoplastic film disposed between two sheets of glass comprises a light-emitting sheet comprising a binder resin and a light-emitting material (see, for example, PTL1). As a light-emitting material which is used for a light-emitting sheet, a fluorescent material that emits light by being irradiated with excitation light is used in some cases. Such a laminated glass comprising a light-emitting sheet, when, for example, used for a windshield, enables the windshield to emit light by irradiating the windshield with excitation light, and therefore application of such laminated glass to HUD and the like has been studied.

It is known that a light-emitting material is generally deteriorated by ultraviolet rays included in sunlight. Therefore, PTL1 discloses: blending an ultraviolet ray absorber in a light-emitting sheet; and providing a resin layer other than a light-emitting sheet, and blending an ultraviolet ray absorber in the resin layer.

CITATION LIST

Patent Literature

PTL1: JP 2014-24312 A

SUMMARY OF INVENTION

Technical Problem

When a laminated glass comprising a light-emitting sheet is used for a windshield or the like of an automobile or the like, it is desired that the emission intensity from the light-emitting sheet be observed with high intensity on the inner side of the car from the viewpoint of displaying information clearly by means of emission. On the other hand, it is desired that the emission intensity from the light-emitting sheet be observed with low intensity on the outer side of the car in order not to leak the information outside.

Conventional laminated glass comprising a light-emitting sheet exhibits about the same emission intensity on both of the inner side of the car and the outer side of the car, and therefore does not meet the above-described requirements sufficiently.

Accordingly, an object of the present invention is to provide a thermoplastic film such that when laminated glass is made using the thermoplastic film, information is displayed relatively strongly on one surface, and the information is displayed relatively weakly on the other surface, and laminated glass comprising this thermoplastic film.

Solution to Problem

The present inventors have conducted diligent studies to find that when the laminated glass is made, and the laminated glass is irradiated, from one surface, with excitation light, which the light-emitting material is capable of absorbing, a difference between luminance A observed on the side of one surface and luminance B observed on the side of the other surface is set to a certain level or higher, and the problem can thereby be solved, and completed the present invention.

That is, the present invention is the following [1] to [12].

[1] A thermoplastic film comprising a light-emitting layer, wherein the light-emitting layer comprises: a thermoplastic resin; and a light emitting material that emits light by being irradiated with excitation light, and when laminated glass obtained by bonding two sheets of clear glass in accordance with JIS R 3211(1998) having a thickness of 2.5 mm with the thermoplastic film interposed therebetween is irradiated, from one surface, with excitation light, which the light-emitting material is capable of absorbing, in a quantity of light of 7 mW/cm$^2$, a difference between luminance A observed on a side of the one surface and luminance B observed on a side of the other surface, (A–B), is 5 cd/m$^2$ or more.

[2] The thermoplastic film according to [1], comprising a visible light absorber.

[3] The thermoplastic film according to [2], further comprising an absorber-containing layer being a layer different from the light-emitting layer and comprising the visible light absorber.

[4] The thermoplastic film according to any one of [1] to [3], further comprising an ultraviolet ray absorber.

[5] The thermoplastic film according to [4], wherein the ultraviolet ray absorber is contained in the absorber-containing layer.

[6] The thermoplastic film according to any one of [3] to [5], further comprising a barrier layer between the light-emitting layer and the absorber-containing layer.

[7] The thermoplastic film according to any one of [1] to [6], wherein a visible light transmittance Tv as measured for the laminated glass obtained by bonding two sheets of clear glass in accordance with JIS R 3211 (1998) having a thickness of 2.5 mm with the thermoplastic film interposed therebetween is 70% or more.

[8] The thermoplastic film according to any one of [1] to [7], being an interlayer film for laminated glass.

[9] A laminated glass comprising: an interlayer film for laminated glass, comprising the thermoplastic film according to [8]; and two glass plates, wherein the interlayer film for laminated glass is disposed between the two glass plates.

[10] A laminated glass comprising: a first glass plate; a second glass plate; and a thermoplastic film disposed between the first glass plate and the second glass plate, wherein the laminated glass comprises a light-emitting material that emits light by irradiation with excitation light, and when the laminated glass is irradiated, from one surface, with excitation light, which the light-emitting material is capable of absorbing, a difference between luminance A observed on a side of the one surface and luminance B observed on a side of the other surface, (A−B), is 5 cd/m$^2$ or more.

[11] The laminated glass according to [10], wherein a coat comprising a visible light absorber is formed on at least one surface of the second glass plate.

[12] An image display system comprising: the laminated glass according to any of [9] to [11]; and a light source.

Advantageous Effects of Invention

According to the present invention, the present invention can provide a thermoplastic film such that when laminated glass is made using the thermoplastic film, information is displayed relatively strongly on one surface, and the information is displayed relatively weakly on the other surface, and laminated glass comprising this thermoplastic film.

DESCRIPTION OF EMBODIMENTS

[Thermoplastic Film]

Figure 1:
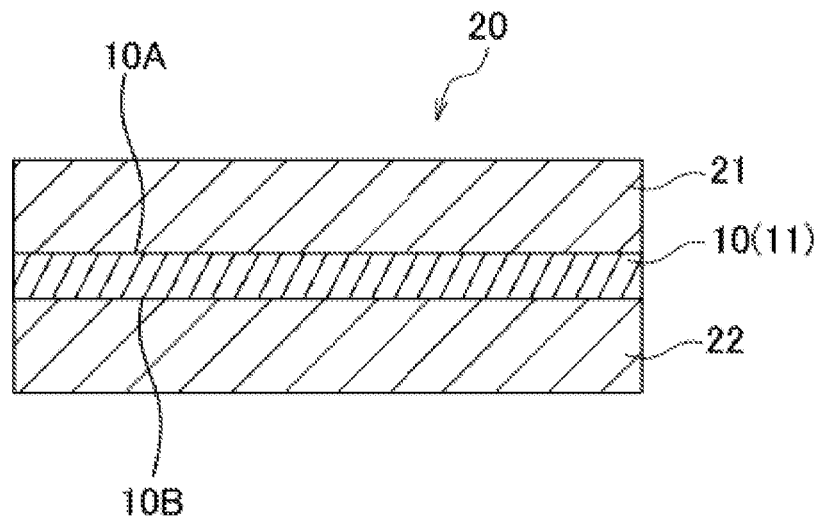
FIG. 1 is a sectional view showing a thermoplastic film of one embodiment of the present invention, and a laminated glass comprising the thermoplastic film.

Hereinafter, the present invention will be described in detail.

A thermoplastic film of the present invention comprises a light-emitting layer, wherein the light-emitting layer comprises a thermoplastic resin and a light-emitting material that emits light by being irradiated with excitation light. In the present invention, two sheets of clear glass in accordance with JIS R 3211(1998) having a thickness of 2.5 mm are used as standard glass. When laminated glass obtained by bonding the two sheets of clear glass with the thermoplastic film of the present invention interposed therebetween is irradiated, from one surface, with excitation light, which the light-emitting material is capable of absorbing, in a quantity of light of 7 mW/cm$^2$, a difference between luminance A observed on the side of one surface and luminance B observed on the side of the other surface, (A−B), is 5 cd/m$^2$ or more.

Luminance A and luminance B can be measured by the method described in Examples.

When the difference between luminance A and luminance B, (A−B), is less than 5 cd/m$^2$, the difference in luminance between one surface and the other surface of the laminated glass is small, and therefore it is difficult to display information clearly on one surface and make it difficult to confirm the information on the other surface. The difference between luminance A and luminance B, (A−B), is preferably 20 or more, more preferably 40 or more, still more preferably 60 or more, and still more preferably 100 or more from the viewpoint of displaying information clearly on one surface of laminated glass and making it difficult to confirm the information on the other surface. The larger the difference between luminance A and luminance B, (A−B), is, the larger the contrast in the information display can be given between one surface and the other surface, but the difference (A−B) is usually 10,000 or less, and more generally 500 or less.

Luminance A is preferably 30 or more, more preferably 50 or more, and still more preferably 70 or more from the viewpoint of displaying information clearly on one surface of laminated glass. Luminance A is preferably 10000 or less, more preferably 7000 or less, and still more preferably 5000 or less from the viewpoint of improving the visibility on the far side of the display.

Luminance A is preferably 1000 or less, more preferably 800 or less, and still more preferably 600 or less from the viewpoint of making it difficult to confirm information on the other surface.

Further, in the present invention, the visible light transmittance Tv as measured for the laminated glass prepared from the thermoplastic film and the standard glass as described above is preferably 70% or more in an application in which, for example, transparency is required. When the visible light transmittance Tv is 70% or more, the transparency at a certain level can be secured, and the thermoplastic film can be used, for example, for a windshield of an automobile. To secure the transparency so that the thermoplastic film can suitably be used for window glass, such as a windshield, the visible light transmittance Tv is more preferably 75% or more, still more preferably 80% or more, and still more preferably 85% or more.

With respect to the visible light transmittance Tv, the higher, the better from the viewpoint of the transparency of the thermoplastic film, but the visible light transmittance Tv is practically 99% or less, and, from the viewpoint of making the difference in luminance between one surface and the other surface of laminated glass larger, preferably 97% or less.

On the other hand, in an application in which privacy protectability or the like is required, and light shieldability is needed, the visible light transmittance Tv may be made low, and is, for example, 50% or less, preferably 45% or less, and still more preferably 40% or less, and is, from the viewpoint of securing a certain level of transparency, preferably 10% or more, more preferably 15% or more, and still more preferably 20% or more.

The visible light transmittance of laminated glass at wavelengths of 380 to 780 nm can be measured in accordance with JIS R3211(1998) using a spectrophotometer ("U-4100" manufactured by Hitachi High-Tech Corporation). Clear glass having a thickness of 2.5 mm and a visible light transmittance of 90.4% is used as the standard glass. By using glass having high transmittance as the standard glass, the above-described difference in luminance between one surface and the other surface, and the visible light transmittance Tv of laminated glass can be used as an index indicating the difference in luminance between one surface and the other surface, and the transmittance originating in the thermoplastic film, respectively.

[Light-Emitting Layer]

The light-emitting layer comprises a thermoplastic resin and a light-emitting material, as described above. The thermoplastic film comprises the light-emitting layer, and is therefore used as a light-emitting film that emits light by being irradiated with excitation light.

(Light-Emitting Material)

As the light-emitting material which is used for the light-emitting layer, for example, a lanthanoid complex, a light-emitting material having a terephthalic acid ester structure, a light-emitting material having a naphthalimide skeleton, a light-emitting material having a coumarin skeleton, a light-emitting material having a quinoline skeleton, and the like can be used. The light-emitting material may be used singly, or two or more light-emitting materials may be used together. By combining a plurality of light-emitting materials each having a different emission wavelength, not only a monochromatic image but also an image in which various colors are combined can be displayed.

Among those described above, the light-emitting material is preferably a lanthanoid complex or a light-emitting material having a terephthalic acid ester structure, and more preferably a light-emitting material having a terephthalic acid ester structure.

Examples of the lanthanoid complex include a lanthanoid complex having a ligand containing a halogen atom. Among the lanthanoid complexes, the lanthanoid complex having a ligand containing a halogen atom emits light with higher emission intensity by being irradiated with a light beam. Examples of the lanthanoid complex having a ligand containing a halogen atom include a lanthanoid complex having a monodentate ligand containing a halogen atom, and a lanthanoid complex having a multidentate ligand containing a halogen atom, such as a lanthanoid complex having a bidentate ligand containing a halogen atom, a lanthanoid complex having a tridentate ligand containing a halogen atom, a lanthanoid complex having a tetradentate ligand containing a halogen atom, a lanthanoid complex having a pentadentate ligand containing a halogen atom, and a lanthanoid complex having a hexadentate ligand containing a halogen atom.

Among others, a lanthanoid complex having a bidentate ligand containing a halogen atom, or a lanthanoid complex having a tridentate ligand containing a halogen atom can emit visible rays with high emission intensity by being irradiated with light of a wavelength of 300 to 410 nm.

On top of that, the lanthanoid complex having a bidentate ligand containing a halogen atom, or the lanthanoid complex having a tridentate ligand containing a halogen atom is excellent in heat resistance. When the thermoplastic film is used as laminated glass, which will be mentioned later, the thermoplastic film is irradiated with infrared rays in sunlight, and therefore is used in a high-temperature environment in many cases, and accordingly, by using the lanthanoid complex having a bidentate ligand containing a halogen atom, or the lanthanoid complex having a tridentate ligand containing a halogen atom, deterioration of the light-emitting material can be prevented.

In the present specification, lanthanoid contains lanthanum, cerium, praseodymium, neodymium, promethium, samarium, europium, gadolinium, terbium, dysprosium, holmium, erbium, thulium, ytterbium, or lutetium. Lanthanoid is preferably neodymium, europium, or terbium, more preferably europium or terbium, and still more preferably europium because further higher emission intensity is obtained.

Examples of the bidentate containing a halogen atom include a ligand having a structure represented by the following general formula (1) and a ligand having a structure represented by the following general formula (2).

(1)

In the general formula (1), $R^1$ and $R^3$ each represent an organic group, at least one of $R^1$ and $R^3$ is an organic group containing a halogen atom, and $R^2$ represents a linear organic group. Each of $R^1$ and $R^3$ is preferably a hydrocarbon group, more preferably a C1-10 hydrocarbon group, still more preferably a C1-5 hydrocarbon group, and particularly preferably a C1-3 hydrocarbon group. In the hydrocarbon groups, part of hydrogen atoms may be replaced by an atom other than the hydrogen atom, and a functional group. Examples of the C1-3 hydrocarbon group include a methyl group, an ethyl group, and a propyl group, in which the hydrogen atoms are not substituted, and a methyl group, an ethyl group, and a propyl group in which part of the hydrogen atoms is replaced by a halogen atom. As the halogen atom in the methyl group, the ethyl group, and the propyl group in which part of the hydrogen atoms is replaced by a halogen atom, a fluorine atom, a chlorine atom, a bromine atom, and an iodine atom can be used. The C1-3 hydrocarbon group is preferably the methyl group, the ethyl group, or the propyl group in which part of the hydrogen atoms is replaced by a halogen atom, and more preferably a trifluoromethyl group because of emitting light with high emission intensity.

$R^2$ is preferably a C1 or more alkylene group, more preferably a C1-5 alkylene group, and most preferably a methylene group of C1. Part of the hydrogen atoms in the C1 or more alkylene group may be replaced by an atom other than the hydrogen atom, and a functional group.

The lanthanoid complex having a ligand containing a halogen atom may have a ligand not containing a halogen atom as long as the lanthanoid complex has at least one ligand containing a halogen atom. Examples of the ligand not containing a halogen atom include a ligand that is the same as the general formula (1) except that the ligand does not contain a halogen atom, and a ligand having a structure represented by any one of the following general formulas (2) to (8). In the ligand having a structure represented by any one of the following general formulas (2) to (8), part of or all of the hydrogen atoms may be replaced by —COOR, —SO₃, —NO₂, —OH, an alkyl group, —NH₂, or the like.

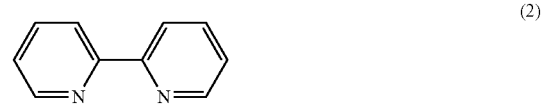

(2)

In the formula (2), two Ns may exist anywhere in the bipyridine skeleton. For example, two Ns exist at the 2- and the 2'-position, the 3- and the 3'-position, the 4- and the 4'-position, the 2- and the 3'-position, the 2- and the 4'-position, or the 3- and the 4'-position of the bipyridine skeleton. Among others, two Ns preferably exist at the 2- and the 2'-position.

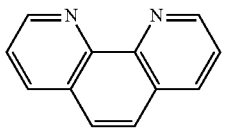
(3)

In the formula (3), two Ns may exist anywhere in the bipyridine skeleton. Among others, two Ns preferably exist at the 1- and the 10-position.

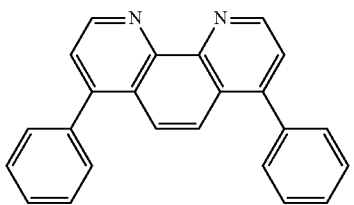
(4)

In the formula (4), two Ns may exist anywhere in the bipyridine skeleton. Among others, two Ns preferably exist at the 1- and the 10-position.

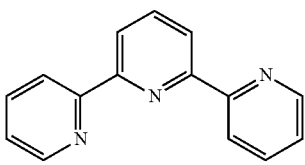
(5)

In the formula (5), three Ns may exist anywhere in the terpyridine skeleton.

(6)

In the formula (6), $R^4$ in the center represents a C1 or more linear organic group.

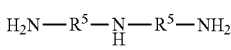
(7)

In the formula (7), two $R^5$s each represent a C1 or more linear organic group.

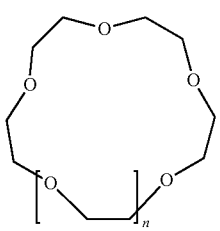
(8)

In the formula (8), n represents an integer of 1 or 2.

Examples of the lanthanoid complex having a bidentate ligand containing a halogen atom include tris(trifluoroacetylacetone)phenanthroline europium (Eu(TFA)$_3$phen), tris(trifluoroacetylacetone)diphenylphenanthroline europium (Eu(TFA)$_3$dpphen), tris(hexafluoroacetylacetone)diphenylphenanthroline europium, tris(hexafluoroacetylacetone)bis(triphenylphosphine) europium, tris(trifluoroacetylacetone)2,2'-bipyridine europium, tris(hexafluoroacetylacetone)2,2'-bipyridine europium, tris(5,5,6,6,7,7,7-heptafluoro-2,4-pentanedionate)2,2'-bipyridine europium ([Eu(FPD)$_3$]bpy), tris(trifluoroacetylacetone)3,4,7,8-tetramethyl-1,10-phenanthroline europium ([Eu(TFA)$_3$]tmphen), tris(5,5,6,6,7,7,7-heptafluoro-2,4-pentanedionate)phenanthroline europium ([Eu(FPD)$_3$]phen), terpyridine trifluoroacetylacetone europium, and terpyridine hexafluoroacetylacetone europium.

Other examples of the lanthanoid complex having a bidentate ligand containing a halogen atom include tris(trifluoroacetylacetone)phenanthroline terbium (Tb(TFA)$_3$phen), tris(trifluoroacetylacetone)diphenylphenanthroline terbium (Tb(TFA)$_3$dpphen), tris(hexafluoroacetylacetone)diphenylphenanthroline terbium, tris(hexafluoroacetylacetone)bis(triphenylphosphine) terbium, tris(trifluoroacetylacetone)2,2'-bipyridine terbium, tris(hexafluoroacetylacetone)2,2'-bipyridine terbium, tris(5,5,6,6,7,7,7-heptafluoro-2,4-pentanedionate)2,2'-bipyridine terbium ([Tb(FPD)$_3$]bpy), tris(trifluoroacetylacetone)3,4,7,8-tetramethyl-1,10-phenanthroline terbium ([Tb(TFA)$_3$]tmphen), tris(5,5,6,6,7,7,7-heptafluoro-2,4-pentanedionate)phenanthroline terbium ([Tb(FPD)$_3$]phen), terpyridine trifluoroacetylacetone terbium, and terpyridine hexafluoroacetylacetone terbium.

As the halogen atom in the lanthanoid complex having a ligand containing a halogen atom, a fluorine atom, a chlorine atom, a bromine atom, and an iodine atom can be used. Among others, a fluorine atom is suitable because the fluorine atom stabilizes the structure of the ligand.

Among the lanthanoid complexes having a bidentate ligand containing a halogen atom, or the lanthanoid complexes having a tridentate ligand containing a halogen atom, a lanthanoid complex having a bidentate ligand having an acetylacetone skeleton containing a halogen atom is suitable because of being excellent in initial light emission properties in particular.

Examples of the lanthanoid complex having a bidentate ligand having an acetylacetone skeleton containing a halogen atom include Eu(TFA)$_3$phen, Eu(TFA)$_3$dpphen, Eu(HFA)$_3$phen, [Eu(FPD)$_3$]bpy, [Eu(TFA)$_3$]tmphen, and [Eu(FPD)$_3$]phen. The structures of these lanthanoid complexes each having a bidentate ligand having an acetylacetone skeleton containing a halogen atom are shown below.

[Chemical Formula 9]

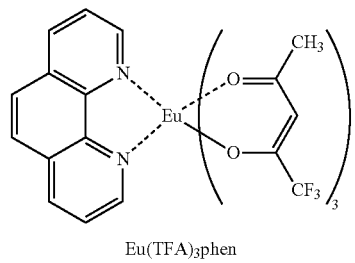

Eu(TFA)$_3$phen

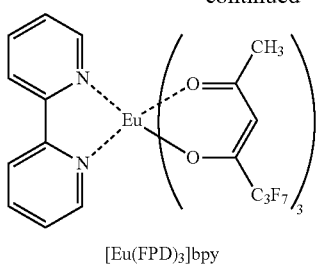

[Eu(FPD)₃]bpy

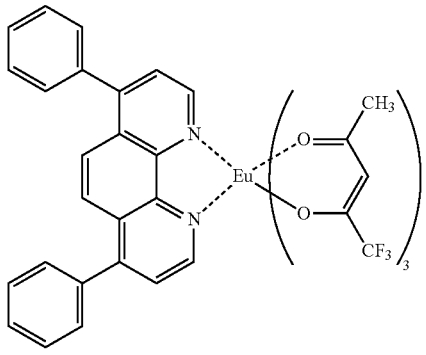

Eu(TFA)₃dpphen

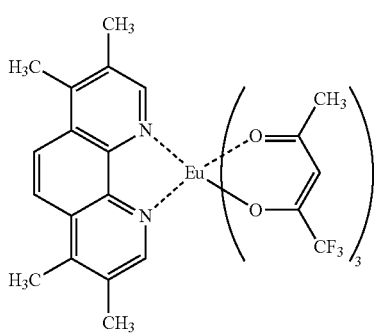

[Eu(TFA)₃]tmphen

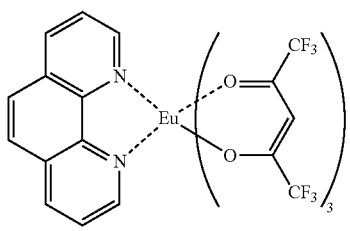

Eu(HFA)₃phen

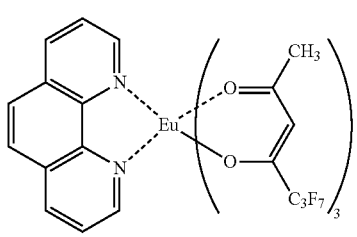

[Eu(FPD)₃]phen

Other examples of the lanthanoid complex having a bidentate ligand having an acetylacetone skeleton containing a halogen atom include Tb(TFA)₃phen, Tb(TFA)₃dpphen, Tb(HFA)₃phen, [Tb(FPD)₃]bpy, [Tb(TFA)₃]tmphen, and [Tb(FPD)₃]phen.

The lanthanoid complex having a ligand containing a halogen atom is preferably in the form of particles. Being in the form of particles makes it easier to disperse the lanthanoid complex having a ligand containing a halogen atom finely in the light-emitting layer.

When the lanthanoid complex having a ligand containing a halogen atom is in the form of particles, a preferred lower limit of the average particle diameter of the lanthanoid complex is 0.01 μm, a preferred upper limit is 10 μm, a more preferred lower limit is 0.03 μm, and a more preferred upper limit is 1 μm.

<Method of Measuring Average Particle Diameter>

The lanthanoid complex is dispersed in methanol (refractive index of solvent: 1.3292, viscosity of solvent: 0.59 mPa·s) at a concentration of about 0.1% by mass, and is then dispersed uniformly by applying an ultrasonic wave, and the measurement is performed using a laser diffraction/scattering particle size distribution measurement apparatus (manufactured by HORIBA, Ltd.) at a liquid temperature of 25° C. The average particle diameter is defined as a primary particle diameter (d50) where the cumulative volume is 50%.

The light-emitting material having a terephthalic acid ester structure emits light by being irradiated with excitation light. Examples of the light-emitting material having a terephthalic acid ester structure include a compound having a structure represented by the following general formula (9) and a compound having a structure represented by the following general formula (10). These may be used singly, or two or more of these may be used.

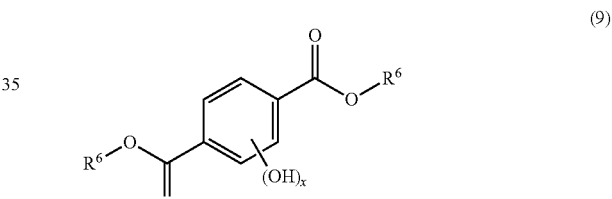

(9)

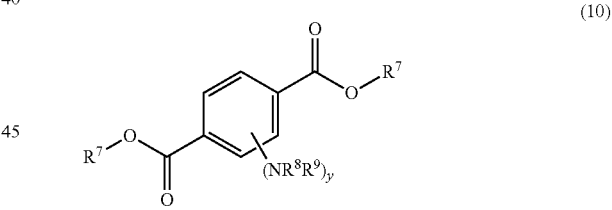

(10)

In the general formula (9), $R^6$ represents an organic group, and x is 1, 2, 3, or 4.

x is preferably 1 or 2, and x is more preferably 2 because the visible light transmittance Tv of the thermoplastic film increases further. In addition, the compound more preferably has a hydroxy group at the 2-position or the 5-position of the benzene ring, and still more preferably has a hydroxy group at the 2-position and the 5-position of the benzene ring.

The organic group of $R^6$ is preferably a hydrocarbon group, more preferably a C1-10 hydrocarbon group, still more preferably a C1-5 hydrocarbon group, and particularly preferably a C1-3 hydrocarbon group. When the number of carbon atoms of the hydrocarbon group is 10 or less, the light-emitting material having a terephthalic acid ester structure can easily be dispersed in the light-emitting layer. The hydrocarbon group is preferably an alkyl group.

Examples of the compound having a structure represented by the general formula (9) include diethyl-2,5-dihydroxyterephthalate and dimethyl-2,5-dihydroxyterephthalate. Among others, the compound having a structure represented by the general formula (9) is preferably diethyl-2,5-dihydroxyterephthalate.

In the general formula (10), $R^7$ represents an organic group, $R^8$ and $R^9$ each represent a hydrogen atom or an organic group, and y is 1, 2, 3, or 4.

The organic group of $R^7$ is preferably a hydrocarbon group, more preferably a C1-10 hydrocarbon group, still more preferably a C1-5 hydrocarbon group, and particularly preferably a C1-3 hydrocarbon group. When the number of carbon atoms of the hydrocarbon groups is equal to or less than the upper limit, the light-emitting material having a terephthalic acid ester structure can easily be dispersed in the light-emitting layer. The hydrocarbon group is preferably an alkyl group.

In the general formula (10), the organic group of $R^8$ and $R^9$ is, for example, a C1-10 hydrocarbon group, and the organic group is preferably a C1-5 hydrocarbon group, and more preferably a C1-3 hydrocarbon group, and the hydrocarbon group is preferably an alkyl group. In addition, each of $R^8$ and $R^9$ is preferably a hydrogen atom. y is preferably 1 or 2, and still more preferably 2. Further, the compound more preferably has $NR^8R^9$ at the 2-position or the 5-position of the benzene ring, and still more preferably has $NR^8R^9$ at the 2-position and the 5-position of the benzene ring.

The compound having a structure represented by the general formula (10) is preferably diethyl-2,5-diaminoterephthalate.

Specific examples of the light-emitting material having a naphthalimide skeleton include 4-bromo-1,8-naphthalimide, 4-amino-1,8-naphthalimide, 4-methoxy-N-methylnaphthalic acid imide, naphthalimide, 4-aminonaphthalimide, N-methyl-4-aminonaphthalimide, N-ethyl-4-aminonaphthalimide, N-propyl-4-aminonaphthalimide, N-n-butyl-4-aminonaphthalimide, 4-acetylaminonaphthalimide, N-methyl-4-acetylaminonaphthalimide, N-ethyl-4-acetylaminonaphthalimide, N-propyl-4-acetylaminonaphthalimide, N-n-butyl-4-acetylaminonaphthalimide, N-methyl-4-methoxynaphthalimide, N-ethyl-4-methoxynaphthalimide, N-propyl-4-methoxynaphthalimide, N-n-butyl-4-methoxynaphthalimide, N-methyl-4-ethoxynaphthalimide, N-ethyl-4-ethoxynaphthalimide, N-propyl-4-ethoxynaphthalimide, N-n-butyl-4-ethoxynaphthalimide, Lumogen F Violet 570 (trade name, manufactured by BASF Japan Ltd.), and Lumogen F Blue 650 (trade name, manufactured by BASF Japan Ltd.).

Examples of the light-emitting material having a coumarin skeleton include a derivative having an electron donating substituent at the 7-position of the coumarin ring. More specific examples thereof include: coumarin-based coloring matter, such as 3-(2'-benzothiazolyl)-7-diethylaminocoumarin (coumarin 6), 3-(2'-benzoimidazolyl)-7-N,N-diethylaminocoumarin (coumarin 7), and 3-(2'-N-methylbenzoimidazolyl)-7-N,N-diethylaminocoumarin (coumarin 30), which are derivatives having an amino group at the 7-position of the coumarin ring, and 2,3,5,6-1H,4H-tetrahydro-8-trifluoromethylquinolizine(9,9a,1-gh)coumarin (coumarin 153); coumarin coloring matter-based dyes, such as Basic Yellow 51; and 7-hydroxycoumarin, 3-cyano-7-hydroxycoumarin, and 7-hydroxy-4-methylcoumarin, which have a hydroxy group at the 7-position of the coumarin ring, 7-diethylamino-4-methylcoumarin, 7-dimethylaminocyclopenta[c]-coumarin, 1,2,4,5,3H,6H, 10H-tetrahydro-8-methyl[1]benzopyrano[9,9a,1-gH]quinolizin-10-one, 7-amino-4-trifluoromethylcoumarin, 1,2,4,5,3H,6H,10H-tetrahydro-9-cyano[1]benzopyrano[9,9a,1-gH]quinolizin-10-one, 1,2,4,5,3H,6H,10H-tetrahydro-9-carbo-t-butoxy[1]benzo- pyrano[9,9a,1-gH]quinolizin-10-one, 7-ethylamino-6-methyl-4-trifluoromethylcoumarin, 1,2,4,5,3H,6H,10H-tetr- ahydro-9-carboethoxy[1]benzopyrano[9,9a,1-gH]quinolizin-10-one, 7-diethylamino-3-(1-methylbenzimidazolyl)coumarin, 7-dimethylamino-4-trifluoromethylcoumarin, 1,2,4,5,3H, 6H, 10H-tetrahydro-9-carboxy[1]bezopyrano[9,9a,1-gH]quinolizin-10-one, 1,2,4,5,3H,6H,10H-tetrahydro-9-acetyl[1]benzopyrano[9,9a,1-gH]quinolizin-10-one, 3-(2-benzimidazolyl)-7-N,N-diethylaminocoumarin, 1,2,4,5,3H,6H, 10H-tetrahydro-8-trifluoromethyl[1]benzopyrano[9,9a,1-gH]quinolizin-10-one, 3-(2-benzothiazolyl)-7-diethylaminocoumarin, 7-diethylaminocoumarin, 7-diethylamino-4-trifluoromethylcoumarin, 2,3,6,7-tetrahydro-9-(trifluoromethyl)-1H,5H,11H-[1]benzopyrano[6,7,8-ij]quinolizin-11-one, 7-amino-4-methylcoumarin, and 4,6-dimethyl-7-ethylaminocoumarin.

Specific examples of the light-emitting material having a quinoline skeleton include 2-(3-oxoindolin-1-ylidene)methylquinoline.

The content of the light-emitting material in the light-emitting layer is preferably 8 parts by mass or less, more preferably 5 parts by mass or less, still more preferably 1.5 parts by mass or less, and further still more preferably 0.8 parts by mass or less based on 100 parts by mass of the thermoplastic resin. Setting the content to the upper limit value of these or less improves the transparency of the thermoplastic film, making it easy to increase the visible light transmittance Tv.

The content of the light-emitting material in the light-emitting layer is preferably 0.01 parts by mass or more, more preferably 0.1 parts by mass or more, still more preferably 0.2 parts by mass or more, and further still more preferably 0.4 parts by mass or more based on 100 parts by mass of the thermoplastic resin. Setting the content of the light-emitting material to the lower limit value of these or more enables a desired image and the like to be displayed with good visibility by irradiation with excitation light.

[Thermoplastic Resin]

The light-emitting layer of the present invention comprises a thermoplastic resin. When the light-emitting layer comprises a thermoplastic resin, the light-emitting layer easily acts as a bonding layer, making the bondability to another layer, such as a glass plate, good. The thermoplastic resin is a matrix component in the light-emitting layer, and the above-described light-emitting material is dispersed or dissolved in the thermoplastic resin.

Examples of the thermoplastic resin include, but not particularly limited to, a polyvinyl acetal resin, an ethylene-vinyl acetate copolymer resin, an ionomer resin, a polyurethane resin, and a thermoplastic elastomer. Using these resins makes it easy to secure the bondability to a glass plate.

In the light-emitting layer of the present invention, the thermoplastic resin may be used singly, or two or more thermoplastic resins may be used together. Among these, the thermoplastic resin is preferably at least one selected from the group consisting of a polyvinyl acetal resin and an ethylene-vinyl acetate copolymer resin, and the thermoplastic resin is more preferably a polyvinyl acetal resin in that the polyvinyl acetal resin, particularly when used together with a plasticizer, exhibits excellent bondability to glass.

(Polyvinyl Acetal Resin)

The polyvinyl acetal resin is obtained by acetalizing polyvinyl alcohol with an aldehyde. Polyvinyl alcohol is obtained by, for example, saponifying a polyvinyl ester, such as polyvinyl acetate. The polyvinyl acetal resin may be used singly, or two or more polyvinyl acetal resins may be used together.

The aldehyde which is used for acetalization is not particularly limited, but a C1-10 aldehyde is suitably used, more preferably a C2-6 aldehyde, and still more preferably a C4 aldehyde.

Examples of the C1-10 aldehyde include, but not particularly limited to, n-butyraldehyde, isobutyraldehyde, n-valeraldehyde, 2-ethylbutyraldehyde, n-hexyl aldehyde, n-octyl aldehyde, n-nonyl aldehyde, n-decyl aldehyde, formaldehyde, acetaldehyde, and benzaldehyde. Among others, n-butyraldehyde, n-hexyl aldehyde, and n-valeraldehyde are preferable, and more preferably n-butyraldehyde. These aldehydes may be used singly, or two or more of these aldehydes may be used together.

As polyvinyl alcohol, polyvinyl alcohol having a degree of saponification of 80 to 99.8 mol % is generally used. The average degree of polymerization of the polyvinyl alcohol is preferably 500 or more, and is preferably 4000 or less in order to adjust the average degree of polymerization of the polyvinyl acetal resin within a desired range. The average degree of polymerization of the polyvinyl alcohol is more preferably 1000 or more, and is more preferably 3600 or less. The average degree of polymerization of the polyvinyl alcohol is determined by a method in accordance with JIS K6726 "Testing methods for polyvinyl alcohol."

The number of carbon atoms of the acetal group contained in the polyvinyl acetal resin is not particularly limited, but is preferably 1 to 10, more preferably 2 to 6, and still more preferably 4. Specifically, the acetal group is particularly preferably a butyral group, and accordingly the polyvinyl acetal resin is preferably a polyvinyl butyral resin.

The degree of acetalization of the polyvinyl acetal resin is preferably 40 mol % or more, and is preferably 85 mol % or less. The degree of acetalization is more preferably 60 mol % or more, and is more preferably 75 mol % or less. When the acetal group is a butyral group, and the polyvinyl acetal resin is a polyvinyl butyral resin, the degree of acetalization means a degree of butyralization.

The amount of the hydroxy group in the polyvinyl acetal resin is preferably 15 mol % or more, and is preferably 35 mol % or less. Setting the amount of the hydroxy group to 15 mol % or more easily makes the bondability to a glass plate or the like good, which easily makes the penetration resistance or the like of laminated glass good. When the polyvinyl acetal resin is used, for example, for laminated glass, setting the amount of the hydroxy group to 35 mol % or less prevents the laminated glass from being too hard. The amount of the hydroxy group in the polyvinyl acetal resin is more preferably 20 mol % or more, and is more preferably 33 mol % or less.

The degree of acetylation (the amount of the acetyl group) of the polyvinyl acetal resin is preferably 0.1 mol % or more, and is preferably 20 mol % or less. Setting the degree of acetylation to the lower limit value or more easily makes the compatibility with a plasticizer or the like good. Setting the degree of acetylation to the upper limit value or less enhances the humidity resistance of the light-emitting layer. From these viewpoints, the degree of acetylation is more preferably 0.3 mol % or more, and still more preferably 0.5 mol % or more, and is more preferably 10 mol % or less, and still more preferably 5 mol % or less.

The amount of the hydroxy group, the degree of acetalization (the degree of butyralization), and the degree of acetylation can be calculated from the results of measurement by methods in accordance with JIS K6728 "Testing methods for polyvinyl butyral."

The average degree of polymerization of the polyvinyl acetal resin is preferably 500 or more, and is preferably 4000 or less. Setting the average degree of polymerization to 500 or more makes the penetration resistance of laminated glass good. Setting the average degree of polymerization to 4000 or less makes it easy to shape laminated glass. The degree of polymerization is more preferably 1000 or more, and is more preferably 3600 or less. The average degree of polymerization of the polyvinyl acetal resin is the same as the average degree of polymerization of polyvinyl alcohol, which is a raw material, and can be determined by the average degree of polymerization of the polyvinyl alcohol.

(Ethylene-Vinyl Acetate Copolymer Resin)

The ethylene-vinyl acetate copolymer resin may be a non-crosslinked ethylene-vinyl acetate copolymer resin or a high-temperature-crosslinked ethylene-vinyl acetate copolymer resin. As the ethylene-vinyl acetate copolymer resin, a resin of an ethylene-vinyl acetate-modified product, such as a saponified product of an ethylene-vinyl acetate copolymer and a hydrolysate of ethylene-vinyl acetate, can also be used.

The vinyl acetate content of the ethylene-vinyl acetate copolymer resin, as measured in accordance with JIS K 6730 "Testing methods for ethylene/vinyl acetate resin" or JIS K 6924-2:1997, is preferably 10% by mass or more and 50% by mass or less, and more preferably 20% by mass or more and 40% by mass or less. Setting the vinyl acetate content to the lower limit value of these or more enhances the bondability to glass, and easily makes the penetration resistance of laminated glass good when the ethylene-vinyl acetate copolymer resin is used for laminated glass. Setting the vinyl acetate content to the upper limit value of these or less enhances the breaking strength of the light-emitting layer, making the impact resistance of laminated glass good.

(Ionomer Resin)

The ionomer resin is not particularly limited, and various ionomer resins can be used. Specific examples thereof include an ethylene-based ionomer, a styrene-based ionomer, a perfluorocarbon-based ionomer, a telechelic ionomer, and a polyurethane ionomer. Among these, an ethylene-based ionomer is preferable in terms of making the mechanical strength, the durability, the transparency, and the like of laminated glass, which will be mentioned later, good, and in terms of having excellent bondability to glass.

As the ethylene-based ionomer, an ionomer of an ethylene/unsaturated carboxylic acid copolymer is suitably used because of having excellent transparency and toughness. The ethylene/unsaturated carboxylic acid copolymer is a copolymer having at least a constitutional unit derived from ethylene and a constitutional unit derived from an unsaturated carboxylic acid, and may have a constitutional unit derived from an additional monomer.

Examples of the unsaturated carboxylic acid include acrylic acid, methacrylic acid, and maleic acid, and acrylic acid and methacrylic acid are preferable, and methacrylic acid is particularly preferable. Examples of the additional monomer include an acrylic acid ester, a methacrylic acid ester, and 1-butene.

The ethylene/unsaturated carboxylic acid copolymer preferably has 75 to 99 mol % of the constitutional unit derived from ethylene, and preferably has 1 to 25 mol % of the constitutional unit derived from an unsaturated carboxylic acid when the amount of all the constitutional units of the copolymer is assumed to be 100 mol %.

The ionomer of the ethylene/unsaturated carboxylic acid copolymer is an ionomer resin obtained by neutralizing or crosslinking at least part of the carboxyl groups of the ethylene/unsaturated carboxylic acid copolymer with a metal ion, and the degree of neutralization of the carboxyl groups is usually 1 to 90%, and preferably 5 to 85%.

Examples of the ion source in the ionomer resin include alkali metals, such as lithium, sodium, potassium, rubidium, and cesium, and polyvalent metals, such as magnesium, calcium, and zinc, and sodium and zinc are preferable.

The method for producing the ionomer resin is not particularly limited, and the ionomer resin can be produced by a conventionally known production method. For example, when an ionomer of an ethylene/unsaturated carboxylic acid copolymer is used as the ionomer resin, radical copolymerization is performed on, for example, ethylene and an unsaturated carboxylic acid at a high temperature and a high pressure to produce an ethylene/unsaturated carboxylic acid copolymer. The ionomer of the ethylene/unsaturated carboxylic acid copolymer can be produced by reacting the ethylene/unsaturated carboxylic acid copolymer and a metal compound containing the above-described ion source.

(Polyurethane Resin)

Examples of the polyurethane resin include a polyurethane obtained by reacting an isocyanate compound and a diol compound, and a polyurethane obtained by reacting an isocyanate compound, a diol compound, and further, a chain extender, such as a polyamine. In addition, the polyurethane resin may be a polyurethane resin containing a sulfur atom. In that case, part or the whole of the diol may be selected from the group consisting of a polythiol and a sulfur-containing polyol. The polyurethane resin can make the bondability to organic glass good. Therefore, the polyurethane resin is suitably used when the glass plate is organic glass.

(Thermoplastic Elastomer)

Examples of the thermoplastic elastomer include a styrene-based thermoplastic elastomer and an aliphatic polyolefin. The styrene-based thermoplastic elastomer is not particularly limited, and a known styrene-based thermoplastic elastomer can be used. The styrene-based thermoplastic elastomer generally has a polymer block of a styrene monomer, which is a hard segment, and a polymer block of a conjugated diene compound or a hydrogenated block thereof, which is a soft segment. Specific examples of the styrene-based thermoplastic elastomer include a styrene-isoprene diblock copolymer, a styrene-butadiene diblock copolymer, a styrene-isoprene-styrene triblock copolymer, a styrene-butadiene/isoprene-styrene triblock copolymer, a styrene-butadiene-styrene triblock copolymer, and hydrogenated products thereof.

The aliphatic polyolefin may be a saturated aliphatic polyolefin, or may be an unsaturated aliphatic polyolefin. The aliphatic polyolefin may be a polyolefin obtained by using a chain olefin as a monomer, or may be a polyolefin obtained by using a cyclic olefin as a monomer. From the viewpoint of enhancing the storage stability or the like of the light-emitting layer effectively, the aliphatic polyolefin is preferably a saturated aliphatic polyolefin.

Examples of the material for the aliphatic polyolefin include ethylene, propylene, 1-butene, trans-2-butene, cis-2-butene, 1-pentene, trans-2-pentene, cis-2-pentene, 1-hexene, trans-2-hexene, cis-2-hexene, trans-3-hexene, cis-3-hexene, 1-heptene, trans-2-heptene, cis-2-heptene, trans-3-heptene, cis-3-heptene, 1-octene, trans-2-octene, cis-2-octene, trans-3-octene, cis-3-octene, trans-4-octene, cis-4-octene, 1-nonene, trans-2-nonene, cis-2-nonene, trans-3-nonene, cis-3-nonene, trans-4-nonene, cis-4-nonene, 1-decene, trans-2-decene, cis-2-decene, trans-3-decene, cis-3-decene, trans-4-decene, cis-4-decene, trans-5-decene, cis-5-decene, 4-methyl-1-pentene, and vinylcyclohexane.

[Plasticizer]

The light-emitting layer of the present invention may further comprise a plasticizer. The light-emitting layer, when comprising a plasticizer, is made more flexible, and as a result, the flexibility of the thermoplastic film and laminated glass can be improved, and the penetration resistance of the laminated glass is also improved. Further, the light-emitting layer can also exhibit high bondability to a glass plate. The plasticizer is particularly effective when contained in the light-emitting layer in the case where a polyvinyl acetal resin is used as the thermoplastic resin.

Examples of the plasticizer include organic ester plasticizers, such as a monobasic organic acid ester and a polybasic organic acid ester, and phosphoric acid plasticizers, such as an organic phosphoric acid plasticizer and an organic phosphorous acid plasticizer. Among others, an organic ester plasticizer is preferable.

Examples of the monobasic organic acid ester include an ester of a glycol and a monobasic organic acid. Examples of the glycol include a polyalkylene glycol in which each alkylene unit has 2 to 4 carbon atoms, and preferably 2 or 3 carbon atoms, and the number of repeating alkylene units is 2 to 10, and preferably 2 to 4. The glycol may be a monoalkylene glycol having 2 to 4 carbon atoms, and preferably 2 or 3 carbon atoms, and having a number of repeating units of 1.

Specific examples of the glycol include ethylene glycol, diethylene glycol, triethylene glycol, tetraethylene glycol, propylene glycol, dipropylene glycol, tripropylene glycol, tetrapropylene glycol, and butylene glycol.

Examples of the monobasic organic acid include a C3-10 organic acid, and specific examples thereof include butyric acid, isobutyric acid, caproic acid, 2-ethyl butyric acid, 2-ethylpentanoic acid, heptylic acid, n-octylic acid, 2-ethylhexylic acid, n-nonylic acid, and decylic acid.

Specific examples of the monobasic organic acid include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, triethylene glycol di-n-heptanoate, tetraethylene glycol di-n-heptanoate, triethylene glycol di-2-ethylbutyrate, ethylene glycol di-2-ethylbutyrate, 1,2-propylene glycol di-2-ethylbutyrate, 1,3-propylene glycol di-2-ethylbutyrate, 1,4-butylene glycol di-2-ethylbutyrate, and 1,2-butylene glycol di-2-ethylbutyrate.

Examples of the polybasic organic acid ester include an ester compound of a C4-12 dibasic organic acid, such as adipic acid, sebacic acid, or azelaic acid, and a C4-10 alcohol. The C4-10 alcohol may be linear, may have a branched structure, or may have a cyclic structure.

Specific examples of the polybasic organic acid ester include dibutyl sebacate, dioctyl azelate, dihexyl adipate, dioctyl adipate, hexyl cyclohexyl adipate, diisononyl adipate, heptyl nonyl adipate, dibutylcarbitol adipate, and a mixed ester of adipic acid. The polybasic organic acid ester may be an oil-modified alkyd sebacate or the like. Examples of the mixed ester of adipic acid include an adipic acid ester prepared from two or more alcohols selected from the group consisting of C4-9 alkyl alcohols and C4-9 cyclic alcohols.

Examples of the organic phosphoric acid plasticizer include phosphoric acid esters, such as tributoxy ethyl phosphate, isodecyl phenyl phosphate, and triisopropyl phosphate.

The plasticizer may be used singly, or two or more plasticizers may be used together.

The plasticizer is preferably an ester of a glycol and a monobasic organic acid among those described above, and triethylene glycol-di-2-ethylhexanoate (3GO) is particularly suitably used.

The content of the plasticizer in the light-emitting layer is not particularly limited, but is preferably 20 parts by mass or more, and is preferably 80 parts by mass or less based on 100 parts by mass of the thermoplastic resin. Setting the content of the plasticizer to 20 parts by mass or more makes laminated glass moderately flexible, making the penetration resistance and the like good. By setting the content of the plasticizer to 80 parts by mass or less, separation of the plasticizer from the light-emitting layer is prevented. The content of the plasticizer is more preferably 30 parts by mass or more, and still more preferably 35 parts by mass or more, and is more preferably 70 parts by mass or less, and still more preferably 63 parts by mass or less.

The thermoplastic resin, or the thermoplastic resin and the plasticizer are the main components in the light-emitting layer, and the total amount of the thermoplastic resin and the plasticizer is usually 70% by mass or more, preferably 80% by mass or more, and still more preferably 90% by mass or more and less than 100% by mass based on the total amount of the light-emitting layer.

The thickness of the light-emitting layer is preferably 0.05 to 1.5 mm, more preferably 0.1 to 1 mm, and still more preferably 0.2 to 0.8 mm. Setting the thickness of the light-emitting layer to 0.05 mm or more enables the light-emitting layer to exhibit sufficient emission performance. In addition, the penetration resistance of laminated glass is made good. Setting the thickness of the light-emitting layer to 1.5 mm or less prevents lowering of the transparency of the light-emitting layer.

(Visible Light Absorber)

The thermoplastic film of the present invention preferably comprises a visible light absorber. The thermoplastic film of the present invention, when comprising a visible light absorber, can absorb light emitted from the light-emitting material. The difference in luminance between one surface and the other surface of laminated glass can be made large utilizing this by allowing the visible light absorber to be contained appropriately in the thermoplastic film in such a way that, for example, with respect to light emitted from the light-emitting material, when the light progresses on the side of one surface, the visible light absorber does not absorb the light so much, and when the light progresses on the side of the other surface, the visible light absorber absorbs the light in a large quantity.

[Short-Wavelength Visible Light Absorber]

The visible light absorber is a compound that absorbs light in the visible light region (360 to 780 nm), and has a maximum absorption wavelength peak in a wavelength region of 360 nm or more and 780 nm or less. The visible light absorber may appropriately be selected according to the purpose of use, or the like of laminated glass, and examples of a preferred embodiment include a visible light absorber which absorbs visible light on the shorter wavelength side. Specifically, the maximum absorption wavelength peak is preferably at 380 nm or more and 430 nm or less, more preferably 390 nm or more and 430 nm or less, and still more preferably 400 nm or more and 425 nm or less. In the following description, the visible light absorber which absorbs visible light on the shorter wavelength side as described above is also referred to as "the short-wavelength visible light absorber."

Using such a short-wavelength visible light absorber can keep the visible light transmittance of laminated glass high and make the difference in luminance between one surface and the other surface large.

In the present specification, the maximum absorption wavelength peak of the visible light absorber, and an ultraviolet ray absorber, which will be mentioned later, can be measured by the following method. A chloroform solution is obtained by mixing 0.0002 to 0.002 parts by mass of the compound to be measured based on 100 parts by mass of chloroform. The obtained chloroform solution is put in a quartz cell for a spectrophotometer, having an optical path length of 1.0 cm. The transmittance from 300 to 2500 nm is measured using an automatic recording spectrophotometer ("U4100" manufactured by Hitachi, Ltd.) to determine a maximum absorption wavelength peak. A maximum absorption wavelength peak refers to a wavelength where the transmittance shows a minimum value, and a plurality of such wavelengths exists in some cases, and in those cases, the maximum absorption wavelength peak refers to a wavelength where the minimum value is the smallest.

Specific examples of the short-wavelength visible light absorber include an indole-based compound, a benzotriazole-based compound, a cyanoacrylate-based compound, and a benzophenone-based compound. Among these, an indole-based compound is preferable. The short-wavelength visible light absorber may be used singly, or two or more visible light absorbers may be used together.

<Indole-Based Compound>

The indole-based compound is a compound having an indole skeleton and being capable of absorbing light in a wavelength region of at least 400 to 420 nm. Preferred examples of the indole-based compound include a compound represented by the following general formula (12).

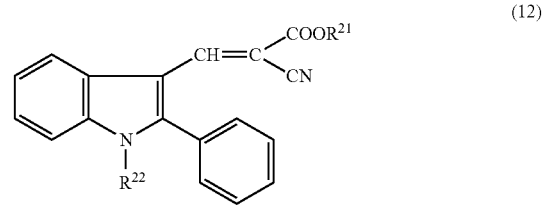

(12)

In the formula (12), $R^{21}$ represents a C1-3 alkyl group, and $R^{22}$ represents a hydrogen atom, a C1-10 alkyl group, or a C7-10 aralkyl group.

Each of the alkyl groups of $R^{21}$ and $R^{22}$ may be an alkyl group having a linear structure, or may be an alkyl group having a branched structure. Examples of $R^{21}$ in the formula (12) include a methyl group, an ethyl group, an isopropyl group, and a n-propyl group, among others, $R^{21}$ is preferably a methyl group, an ethyl group, or an isopropyl group, and from the viewpoint of light resistance, $R^{21}$ is more preferably a methyl group or an ethyl group.

$R^{22}$ in the formula (12) is preferably a C1-10 alkyl group, and more preferably a C1-8 alkyl group. Examples of the C1-10 alkyl group include a methyl group, an ethyl group, an isopropyl group, a n-propyl group, an isobutyl group, a n-butyl group, a pentyl group, a hexyl group, a 2-ethylhexyl group, and a n-octyl group. Examples of the C7-10 aralkyl group include a benzyl group, a phenylethyl group, a phenylpropyl group, and a phenylbutyl group.

The indole-based compound is not particularly limited, but the maximum absorption wavelength peak is, for example, at 380 to 400 nm, and preferably 385 to 395 nm.

Examples of the benzotriazole-based compound which is used as the short-wavelength visible light absorber include a benzotriazole-based compound having a heterocyclic group which is bonded to the 5- and the 6-position of the benzotriazole skeleton, and forms a 5-membered ring or a 6-membered ring with the phenyl ring. A benzotriazole-based compound generally absorbs light in the ultraviolet ray region, and when a heterocyclic group is further formed, the absorption wavelength thereby shifts to the longer wavelength side. Therefore, the benzotriazole-based compound having the above-described structure can absorb visible light on the shorter wavelength side. In addition, the maximum absorption wavelength peak can be positioned in a wavelength region of 400 to 420 nm, or in the vicinity of the wavelength region, as described above. Example of the atom which forms a heterocyclic group include a nitrogen atom, an oxygen atom, and a sulfur atom. Two or more polycyclic skeletons in which a heterocyclic ring is bonded to a benzotriazole skeleton may be bonded to each other through a crosslinking group.

The benzotriazole-based compound, the absorption wavelength of which shifts to the longer wavelength side as described above, is described in, for example, International Publication WO 2008/000646.

Examples of the cyanoacrylate-based compound which is used as the short-wavelength visible light absorber include a cyanoacrylate-based compound having a basic skeleton of 2-cyano-3,3-diphenylacrylate to which an electron withdrawing group is bonded as a substituent on the benzene ring. Examples of the electron withdrawing group include a halogen group and an ester group. Further, the electron withdrawing group may be a heterocyclic group which forms a 5-membered ring, a 6-membered ring, or the like with the benzene ring, or may be a heterocyclic group which forms a polycyclic ring with the benzene ring. A compound having a 2-cyano-3,3-diphenylacrylate skeleton absorbs ultraviolet rays, and when an electron withdrawing group is bonded as described above, the absorption wavelength region thereby shifts to the longer wavelength side, so that the compound can absorb the visible light on the shorter wavelength side of 400 to 420 nm.

Examples of the benzophenone-based compound which is used as the short-wavelength visible light absorber include a benzophenone-based compound having a benzophenone skeleton to which an electron withdrawing group is bonded as a substituent on the benzene ring. Examples of the electron withdrawing group include a halogen group and an ester group, and the electron withdrawing group may be a heterocyclic group which forms a 5-membered ring, a 6-membered ring, or the like with the benzene ring, or may be a heterocyclic group which forms a polycyclic ring with the benzene ring. The benzophenone-based compound may be a compound which is symmetrical about the carbonyl group (C=O) of the benzophenone skeleton.

A compound having a benzophenone skeleton absorbs ultraviolet rays, and when an electron withdrawing group is bonded as described above, the absorption wavelength region thereby shifts to the longer wavelength side, so that the compound can absorb visible light of short wavelengths.

[Dye and Pigment]

Examples of another preferred embodiment of the visible light absorber include a visible light absorber comprising at least one or more selected from the group consisting of dyes and pigments. Using such a visible light absorber can make the difference in luminance between one surface and the other surface of laminated glass larger. In addition, by using a dye or a pigment, the light shieldability can be secured, and privacy protectability and the like can be enhanced.

Examples of the dye include, but not particularly limited to, yellow dyes, such as an anthraquinone dye, a quinoline dye, an isoquinoline dye, a monoazo dye, a disazo dye, a quinophthalone dye, a perylene dye, a triphenylmethane dye, and a methine dye, a phthalocyanine compound, a naphthalocyanine compound, and an anthracyanine compound. Among these, from the viewpoint of making the difference in luminance between one surface and the other surface of laminated glass larger, a yellow dye and a phthalocyanine compound are preferable, and a yellow dye and a phthalocyanine compound are preferably used together. The yellow dye is preferably a perylene dye, the phthalocyanine compound is preferably a phthalocyanine compound containing a vanadium atom or a copper atom, and more preferably a phthalocyanine compound having a copper atom.

As the pigment, black pigments, such as titanium black, carbon black, and aniline black, anthraquinone pigments, and the likes can be used, and among others, carbon black is preferable.

The pigment is preferably used together with the above-described dye, and particularly from the viewpoint of making the difference in luminance between one surface and the other surface of laminated glass larger, a phthalocyanine compound, a perylene dye, and a black pigment, such as carbon black, are preferably used together, or an anthraquinone dye and a black pigment, such as carbon black, are preferably used together. In addition, the pigments are also preferably used together, and for example, an anthraquinone pigment and a black pigment, such as carbon black, are also preferably used together.

[Absorber-Containing Layer]

The visible light absorber may be contained in the light-emitting layer, but preferably, an additional layer other than the light-emitting layer is provided, and the visible light absorber is contained in the additional layer (hereinafter, also referred to as "absorber-containing layer"). The absorber-containing layer may be laminated directly or through another layer on the light-emitting layer, and the thermoplastic film may have a multi-layered structure.

When the thermoplastic film comprises the absorber-containing layer, and is used for window glass, such as a windshield for an automobile, the light-emitting layer may be disposed on the indoor side (that is, as for an automobile, the inner side of the car), and the absorber-containing layer may be disposed on the outdoor side (that is, as for an automobile, the outer side of the car). In the case where the absorber-containing layer is disposed on the outdoor side, when light emitted from the light-emitting material progresses on the outdoor side, the light is absorbed by the absorber-containing layer, and conversely, when the light progresses on the indoor side, the light is not absorbed. As a result, the difference between the luminance on the indoor side and the luminance on the outdoor side is made large, making it difficult to see the information displayed on the windshield from the outdoor side.

In addition, when the thermoplastic film is irradiated with excitation light from an excitation light source on the indoor side, the excitation light from the excitation light source is incident on the light-emitting layer without being absorbed by the visible light absorber by providing the absorber-containing layer comprising a visible light absorber. Therefore, even when the thermoplastic film comprises a visible light absorber, the emission of the light-emitting layer by excitation light is not inhibited by the visible light absorber.

The absorber-containing layer preferably comprises a thermoplastic resin in addition to the visible light absorber. By comprising the thermoplastic resin, the absorber-containing layer easily bonds to the light-emitting layer, and a barrier layer, which will be mentioned later, making it easy to shape the thermoplastic film. In addition, the bondability of the thermoplastic film to a glass plate is easily enhanced. In the absorber-containing layer, the visible light absorber, and an ultraviolet ray absorber, which will be mentioned later, may be dispersed or dissolved in the thermoplastic resin.

Examples of the thermoplastic resin which is used in the absorber-containing layer include, but not particularly limited to, a polyvinyl acetal resin, an ethylene-vinyl acetate copolymer resin, an ionomer resin, a polyurethane resin, and a thermoplastic elastomer. Using these resins makes it easy to secure the bondability to a glass plate.

In the absorber-containing layer of the present invention, the thermoplastic resin may be used singly, or two or more thermoplastic resins may be used together. Among these, the thermoplastic resin is preferably at least one selected from the group consisting of a polyvinyl acetal resin and an ethylene-vinyl acetate copolymer resin, and the thermoplastic resin is more preferably a polyvinyl acetal resin in that the polyvinyl acetal resin, particularly when used together with a plasticizer, exhibits excellent bondability to glass.

When the absorber-containing layer comprises a thermoplastic resin, the same types of resins may be used, or different types of resins may be used as the thermoplastic resin in the light-emitting layer and the thermoplastic resin in the absorber-containing layer, but the same types of resins are preferably used. For example, if the thermoplastic resin in the light-emitting layer is a polyvinyl acetal resin, the thermoplastic resin in the absorber-containing layer is preferably a polyvinyl acetal resin, too. Further, for example, if the thermoplastic resin in the light-emitting layer is an ethylene-vinyl acetate copolymer resin, the thermoplastic resin in the absorber-containing layer is preferably an ethylene-vinyl acetate copolymer resin, too.

Details on the polyvinyl acetal resin, the ethylene-vinyl acetate copolymer resin, the ionomer resin, the polyurethane resin, and the thermoplastic elastomer are as described in Light-emitting Layer, and therefore the description is omitted.

The absorber-containing layer, when comprising a thermoplastic resin, may further comprise a plasticizer. The absorber-containing layer, when comprising a plasticizer, is made to be more flexible, and, when used, for example, for laminated glass, makes the laminated glass flexible. Further, the absorber-containing layer can exhibit enhanced bondability to a glass plate. The absorber-containing layer is particularly effective when comprising a plasticizer in the case where a polyvinyl acetal resin is used as the thermoplastic resin.

Examples of the plasticizer include organic ester plasticizers, such as a monobasic organic acid ester and a polybasic organic acid ester, and phosphoric acid plasticizers, such as an organic phosphoric acid plasticizer and an organic phosphorous acid plasticizer. Specific examples of the plasticizer are as described above. Among these, an organic ester plasticizer is preferable, and triethylene glycol-di-2-ethyl-hexanoate (3GO) is particularly suitably used. Also, in the absorber-containing layer, the plasticizer may be used singly, or two or more plasticizers may be used together.

The content of the plasticizer in the absorber-containing layer is not particularly limited, but a preferred lower limit is 30 parts by mass, and a preferred upper limit is 70 parts by mass based on 100 parts by mass of the thermoplastic resin. Setting the content of the plasticizer to 30 parts by mass or more makes laminated glass moderately flexible, making handlability and the like good. By setting the content of the plasticizer to 70 parts by mass or less, separation of the plasticizer from the absorber-containing layer is prevented. A more preferred lower limit of the content of the plasticizer is 35 parts by mass, and a more preferred upper limit of the content of the plasticizer is 63 parts by mass.

The absorber-containing layer may be such that the thermoplastic resin, or the thermoplastic resin and the plasticizer are the main components, and the total amount of the thermoplastic resin and the plasticizer is usually 70% by mass or more, preferably 80% by mass or more, and still more preferably 90% by mass or more based on the total amount of the absorber-containing layer.

The content of the visible light absorber in the absorber-containing layer is preferably 0.0001 parts by mass or more, more preferably 0.001 parts by mass or more, and still more preferably 0.002 parts by mass or more based on 100 parts by mass of the thermoplastic resin. The content of the visible light absorber in the absorber-containing layer is preferably 5 parts by mass or less, more preferably 2 parts by mass or less, and still more preferably 1 part by mass or less. By setting the content of the visible light absorber to the lower limit value or more, the difference in luminance between one surface and the other surface of laminated glass can be made large. By setting the content of the visible light absorber to the upper limit value or less, the effects commensurate with the content are easily exhibited.

The content of the visible light absorber in the absorber-containing layer is preferably adjusted appropriately according to the type of the visible light absorber, and when the short-wavelength visible light absorber is used as the visible light absorber, the content of the visible light absorber is preferably 0.0001 parts by mass or more, more preferably 0.001 parts by mass or more, and still more preferably 0.0015 parts by mass or more based on 100 parts by mass of the resin. The content of the visible light absorber in the absorber-containing layer is preferably 0.5 parts by mass or less, more preferably 0.3 parts by mass or less, still more preferably 0.1 parts by mass or less, and still more preferably 0.01 parts by mass or less. By setting the content of the visible light absorber to the lower limit value or more, the difference in luminance between one surface and the other surface of laminated glass can be made large. By setting the content of the visible light absorber to the upper limit value or less, coloration of the absorber-containing layer due to the visible light absorber can be prevented, and the effects commensurate with the content are easily exhibited.

When at least one or more selected from the group consisting of dyes and pigments is used as the visible light absorber, the content of the visible light absorber is preferably 0.001 parts by mass or more, more preferably 0.01 parts by mass or more, and still more preferably 0.1 parts by mass or more based on 100 parts by mass of the resin. The content of the visible light absorber is preferably 5 parts by mass or less, more preferably 2 parts by mass or less, and still more preferably 1 part by mass or less. By setting the content of the visible light absorber to the lower limit value or more, the difference in luminance between one surface and the other surface of laminated glass can be made large. In addition, the light shieldability can easily be secured. On the other hand, by setting the content of the visible light absorber to the upper limit value or less, the effects commensurate with the content are easily exhibited.

The content of the visible light absorber in the case where a plurality of kinds of visible light absorbers are used means the total content of the visible light absorbers.

The absorber-containing layer is a layer substantially free of a light-emitting material. When the absorber-containing layer is substantially free of a light-emitting material, the difference in luminance between one surface and the other surface of laminated glass can thereby be made large.

Being substantially free of a light-emitting material means not blending a light-emitting material intentionally in the absorber-containing layer, and there is a possibility that a light-emitting material is unavoidably contained in the absorber-containing layer. For example, when a barrier layer, which will be mentioned later, is not provided, a light-emitting material migrates into the absorber-containing layer from the light-emitting layer in some cases. In addition, there is a possibility that a light-emitting material is unavoidably mixed in the production process.

Even if a light-emitting material is unavoidably contained in the absorber-containing layer, the content of the light-emitting material in the absorber-containing layer is sufficiently smaller than the content of the light-emitting material in the light-emitting layer. Specifically, the content of the light-emitting material based on 100 parts by mass of the thermoplastic resin in the absorber-containing layer is sufficiently smaller than the content of the light-emitting material based on 100 parts by mass of the thermoplastic resin in the light-emitting layer, and may be, for example, less than ⅕, and preferably less than 1/10.

(Ultraviolet Ray Absorber)

The thermoplastic film of the present invention preferably comprises an ultraviolet ray absorber. The ultraviolet ray absorber is preferably contained at least in any one of the light-emitting layer and the absorber-containing layer, more preferably contained at least in the absorber-containing layer, and still more preferably contained in both of the light-emitting layer and the absorber-containing layer. That is, the absorber-containing layer preferably comprises an ultraviolet ray absorber in addition to the above-described visible light absorber.

When the absorber-containing layer comprises an ultraviolet ray absorber in addition to the visible light-absorber, thereby the difference in luminance between one surface and the other surface of laminated glass is easily made large. Therefore, lowering of the emission intensity can more effectively be suppressed even after the thermoplastic film is irradiated with ultraviolet rays for a long period of time.

Further, when the light-emitting layer and the absorber-containing layer comprise an ultraviolet ray absorber, deterioration of the light-emitting layer and the absorber-containing layer by light due to sunlight or the like can also be prevented. Furthermore, when the thermoplastic film is used, for example, for window glass, transmission of ultraviolet rays into the indoor side (the inner side of a car) through the window glass can be prevented.

The ultraviolet ray absorber is a compound having a maximum absorption wavelength peak in a wavelength region of 300 nm or more and less than 360 nm, preferably 330 nm or more and less than 360 nm, and more preferably 345 nm or more and less than 360 nm.

As the ultraviolet ray absorber, for example, a compound having a malonic acid ester skeleton, a compound having an oxalic anilide skeleton, a compound having a benzotriazole skeleton, a compound having a benzophenone skeleton, a compound having a triazine skeleton, a compound having a benzoate skeleton, and a compound having a hindered amine skeleton can be used. Among these, a compound having a benzotriazole skeleton (benzotriazole-based compound) is preferable.

Preferred specific examples of the benzotriazole-based compound include a compound represented by the following general formula (13). The compound represented by the following formula (13) is preferably contained in the light-emitting layer or the absorber-containing layer, or both of these, but is more preferably contained in both of the light-emitting layer and the absorber-containing layer.

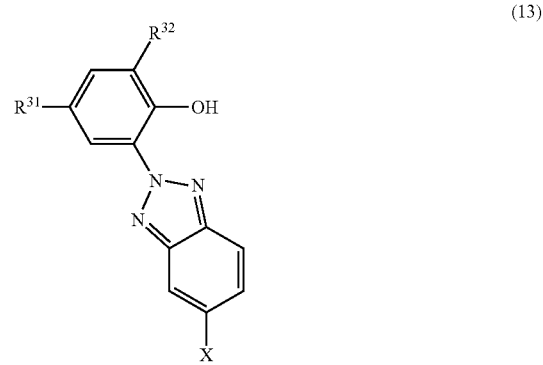

(13)

wherein, $R^{31}$ represents a hydrogen atom, a C1-8 alkyl group, or a C4-20 alkoxycarbonylalkyl group, $R^{32}$ represents a hydrogen atom or a C1-8 alkyl group, and X is a chlorine atom or a hydrogen atom.

In the formula (13), the alkyl groups of $R^{31}$ and $R^{32}$ may each be an alkyl group having a linear structure, or an alkyl group having a branched structure. The alkoxycarbonylalkyl group may be an alkoxycarbonylalkyl group having a linear structure, or an alkoxycarbonylalkyl group having a branched structure. Examples of $R^{31}$ and $R^{32}$ include a hydrogen atom, a methyl group, an ethyl group, a n-propyl group, an iso-propyl group, a n-butyl group, a tert-butyl group, a pentyl group, a hexyl group, and an octyl group. In addition to these, examples of $R^{31}$ include a methoxycarbonylpropyl group, an octyloxycarbonylpropyl group. Among others, $R^{31}$ is preferably a hydrogen atom or an alkyl group, and is particularly preferably a hydrogen atom, a methyl group, a tert-butyl group, a pentyl group, or an octyl group. $R^{31}$ and $R^{32}$ may be the same or different.

Specific examples of the compound represented by the formula (13) include 2-(3-t-butyl-5-methyl-2-hydroxyphenyl)-5-chlorobenzotriazole, 2-(3,5-di-t-butyl-2-hydroxyphenyl)-5-chlorobenzotriazole, octyl 3-[3-tert-butyl-5-(5-chloro-2H-benzotriazol-2-yl)-4-hydroxyphenyl]propionate, methyl 3-(5-chloro-2H-benzotriazol-2-yl)-5-(1,1-dimethylethyl)-4-hydroxyphenylpropionate, and 2-(3,5-di-tert-amyl-2-hydroxyphenyl)benzotriazole.

When the ultraviolet ray absorber is contained in at least any one of the light-emitting layer and the absorber-containing layer, the content of the ultraviolet ray absorber in the layer in which the ultraviolet ray absorber is contained is preferably 0.01 parts by mass or more, more preferably 0.05 parts by mass or more, and still more preferably 0.1 parts by mass or more based on 100 parts by mass of the thermoplastic resin. The content of the ultraviolet ray absorber is preferably 2.0 parts by mass or less, more preferably 1.5 parts by mass or less, and still more preferably 1.2 parts by mass or less based on 100 parts by mass of the thermoplastic resin. By setting the content of the ultraviolet ray absorber to the lower limit value of these or more, deterioration of each layer can be prevented. By setting the content of the ultraviolet ray absorber to the upper limit value of these or less, coloration of the layer due to the ultraviolet ray absorber can be prevented.

The content of the ultraviolet ray absorber in each of the light-emitting layer and the absorber-containing layer is preferably adjusted as follows.

The content of the ultraviolet ray absorber in the light-emitting layer is, for example, 0.01 parts by mass or more, preferably 0.05 parts by mass or more, and more preferably 0.1 parts by mass or more based on 100 parts by mass of the thermoplastic resin. By setting the content of the ultraviolet ray absorber in the light-emitting layer to these contents or more, deterioration of the light-emitting layer by being irradiated with sunlight or the like can be prevented.

The content of the ultraviolet ray absorber in the light-emitting layer is, for example, 1.5 parts by mass or less, preferably 0.7 parts by mass or less, and more preferably 0.35 parts by mass or less based on 100 parts by mass of the thermoplastic resin. By setting the content of the ultraviolet ray absorber to the upper limit value of these or less, excitation light which irradiates the light-emitting layer is not absorbed so much by the ultraviolet ray absorber, and therefore the light-emitting layer can more efficiently emit light by the excitation light.

The content of the ultraviolet ray absorber in the absorber-containing layer is, for example, 0.1 parts by mass or more, preferably more than 0.2 parts by mass, more preferably 0.4 parts by mass or more, and still more preferably 0.6 parts by mass or more based on 100 parts by mass of the thermoplastic resin. By setting the content of the ultraviolet ray absorber to the lower limit value of these or more, it is made easy to prevent incidence of ultraviolet rays on the light-emitting layer, and the absorber-containing layer itself is made unlikely to be deteriorated by light from outside, such as sunlight.

The content of the ultraviolet ray absorber in the absorber-containing layer is preferably 2.0 parts by mass or less, more preferably 1.5 parts by mass or less, and still more preferably 1.2 parts by mass or less based on 100 parts by mass of the thermoplastic resin. By setting the content of the ultraviolet ray absorber in the absorber-containing layer to the upper limit value of these or less, coloration of the absorber-containing layer due to the ultraviolet ray absorber can be prevented. In addition, the ultraviolet ray absorber can adequately be dispersed or dissolved in the thermoplastic resin, and the effects commensurate with the content are easily exhibited.

When the ultraviolet ray absorber is contained in both of the absorber-containing layer and the light-emitting layer, the content of the ultraviolet ray absorber based on 100 parts by mass of the thermoplastic resin in the absorber-containing layer is preferably larger than the content of the ultraviolet ray absorber based on 100 parts by mass of the thermoplastic resin in the light-emitting layer.

Such adjustment makes the emission by the light-emitting layer good, and easily makes the difference in luminance between one surface and the other surface of laminated glass large. In this case, the difference in the content based on 100 parts by mass of the thermoplastic resin (the content in the absorber-containing layer–the content in the light-emitting layer) is, for example, 0.1 parts by mass or more, preferably 0.3 parts by mass or more, and more preferably 0.5 parts by mass or more.

[Other Additives]

If necessary, coloring matter other than the light-emitting material may be blended in the thermoplastic film. The coloring matter may be contained in the absorber-containing layer or the light-emitting layer, or both of these, but is preferably contained in the absorber-containing layer. When the absorber-containing layer comprises a visible light absorber, coloration thereby occurs in the absorber-containing layer in some cases, but by allowing coloring matter to be contained, the color of the absorber-containing layer can be changed into a desired color. The coloring matter is not particularly limited, and may be any of pigments, dyes, and the likes, or may be any coloring matter of blue coloring matter, red coloring matter, yellow coloring matter, green coloring matter, and the like.

Further, if necessary, the thermoplastic film may comprise additives such as an infrared ray absorber, an antioxidant, a light stabilizer, an adhesive strength modifier, a fluorescent brightener, a crystal nucleating agent, and a dispersant. The light-emitting layer may comprise one or more selected from the group consisting of these. The absorber-containing layer as well as the light-emitting layer may comprise one or more selected from the group consisting of these.

The infrared ray absorber is not particularly limited as long as it has performance of shielding infrared rays, but, for example, tin-doped indium oxide particle is suitable. The absorber-containing layer, when comprising an infrared ray absorber, can exhibit high heat shieldability.

Examples of the antioxidant include, but not particularly limited to, 2,2-bis[[[3-(3,5-di-tert-butyl-4-hydroxyphenyl)propionyl]oxy]methyl]propane-1,3-diol, 1,3-bis[3-(3,5-di-tert-butyl-4-hydroxyphenyl)propionate], 4,4'-thiobis(6-tert-butyl-3-methylphenol), 4,4'-dimethyl-6,6'-di(tert-butyl)[2,2'-methylenebis(phenol)], 2,6-di-t-butyl-p-cresol, and 4,4'-butylidenebis-(6-t-butyl-3-methylphenol).

Examples of the crystal nucleating agent include, but not particularly limited to, dibenzylidene sorbitol, dibenzylidene xylitol, dibenzylidene dulcitol, dibenzylidene mannitol, and calixarene. The crystal nucleating agent is suitably used when an ethylene-vinyl acetate copolymer resin is used as the thermoplastic resin.

As the adhesive strength modifier, for example, various magnesium salts or potassium salts, and the like are used.

[Barrier Layer]

The thermoplastic film may further comprise a barrier layer between the light-emitting layer and the absorber-containing layer. The barrier layer is a layer for preventing diffusion of the light-emitting material, and specifically prevents migration of the light-emitting material blended in the light-emitting layer into the absorber-containing layer. For that reason, the light-emitting material stays in the light-emitting layer, and the ultraviolet ray absorber and the visible light absorber stay in the absorber-containing layer even after a long period of use, thus making it easy to reduce the difference in luminance between one surface and the other surface of laminated glass.

The barrier layer may comprise a resin layer. Examples of the resin which forms the resin layer include polyvinyl acetal resins, such as a polyvinyl butyral resin, polyester resins, such as polyethylene terephthalate, and acrylic resins.

As the acrylic resin, an acrylic polymer comprising a constitutional unit derived from a hydroxy group-containing (meth)acrylate is preferable, and specifically polyhydroxypropyl methacrylate (HPMA resin), polyhydroxyethyl methacrylate (HEMA resin), and the like are preferable.

As the resin which is used for the barrier layer, polyethylene terephthalate, polyhydroxypropyl methacrylate, polyhydroxyethyl methacrylate are preferable, and among others, polyethylene terephthalate (PET) is preferable. Polyethylene terephthalate may be modified PET, and, for example, cyclohexanedimethylene-modified PET (PETG) is preferable.

The resin which is used for the barrier layer may be used singly, or two or more such resins may be used together.

The barrier layer may comprise a single substance of the resin, but an additive may be blended in the barrier layer as long as the function of the barrier layer is not inhibited. Examples of the additive include an antioxidant, a light stabilizer, a fluorescent brightener, and a crystal nucleating agent. The details on these are as described above.

In addition, the barrier layer is preferably substantially free of a plasticizer. When the barrier layer does not comprise a plasticizer, diffusion of the light-emitting material and the like can thereby be prevented. Particularly when both of the light-emitting layer and the absorber-containing layer comprise a plasticizer, diffusion of the light-emitting material and the like easily occurs, and therefore when both of the light-emitting layer and the absorber-containing layer comprise a plasticizer, the barrier layer is preferably substantially free of a plasticizer.

The phrase "substantially free of a plasticizer" means that a plasticizer may be contained in an amount not impairing the function of the barrier layer, or a plasticizer mixed therein, for example, unintentionally and unavoidably may be contained. The content of the plasticizer in the barrier layer may be, for example, less than 2 parts by mass, and is preferably less than 1 part by mass, more preferably less than 0.5 parts by mass, and most preferably 0 parts by mass based on 100 parts by mass of the thermoplastic resin.

The thickness of the barrier layer is preferably 15 to 300 μm. By setting the thickness of the barrier layer to 15 μm or more, the barrier ability is made good, and diffusion of the light-emitting material and the like can be prevented. By setting the thickness of the barrier layer to 300 μm or less, the flexibility of the thermoplastic film can be secured. From the viewpoint of barrier performance, the thickness of the barrier layer is more preferably 30 μm or more, and still more preferably 50 μm or more. From the viewpoint of flexibility of the thermoplastic film, the thickness of the barrier layer is more preferably 200 μm or less, and still more preferably 150 μm or less.

(Layer Constitution)

Next, the layer constitution of the thermoplastic film of the present invention will be described with reference to the drawings. As described above, the thermoplastic film 10 may comprise a single layer of a light-emitting layer 11 (see FIG. 1), but preferably comprises the light-emitting layer 11 and an absorber-containing layer 12, as shown in FIGS. 2 and 3.

Figure 2:
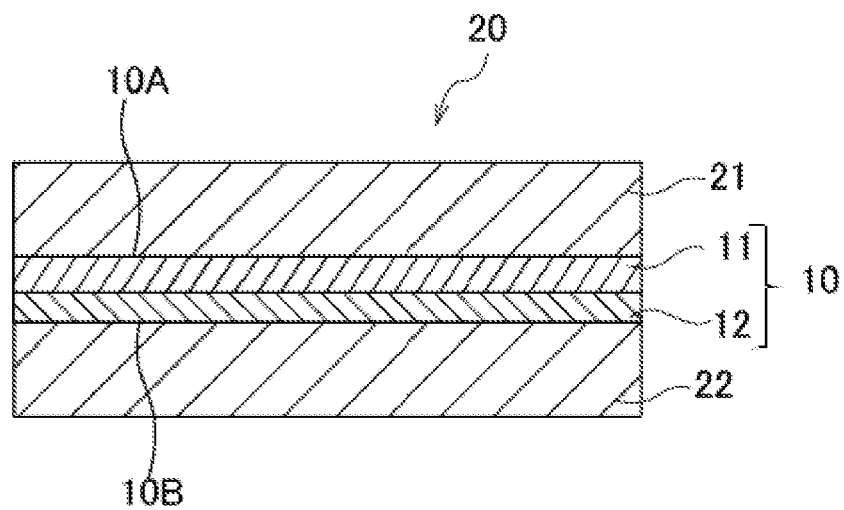
FIG. 2 is a sectional view showing a thermoplastic film of one embodiment of the present invention, and a laminated glass comprising the thermoplastic film.
Figure 3:
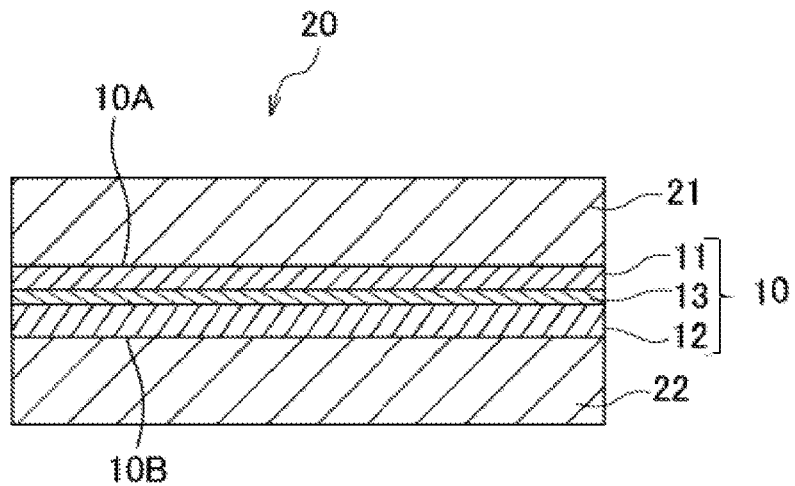
FIG. 3 is a sectional view showing a thermoplastic film of one embodiment of the present invention, and a laminated glass comprising the thermoplastic film.

The thermoplastic film 10 comprises the light-emitting layer 11 and the absorber-containing layer 12 laminated on the light-emitting layer 11 as shown in FIG. 2, and may comprise these two layers, but may comprise another layer, and, for example, a barrier layer 13 may be provided between the light-emitting layer 11 and the absorber-containing layer 12, as shown in FIG. 3.

The thermoplastic film 10 is used for window glass, and preferably window glass for an automobile, such as a windshield, as will be mentioned later, and one surface 10A is disposed on the indoor side (as for an automobile, the inner side of the car), and the other surface 10B is disposed on the outdoor side (as for an automobile, the outer side of the car). The thermoplastic film 10 is irradiated with excitation light from an excitation light source to allow the light-emitting layer 11 to emit light, and the excitation light from the excitation light source is incident from the indoor side, that is, from the one surface 10A of the thermoplastic film 10. The emission of the light-emitting layer 11 is generally observed from the side of the one surface 10A (that is, the indoor side).

When the thermoplastic film 10 comprises the light-emitting layer 11 and the absorber-containing layer 12, as shown in FIGS. 2 and 3, the light-emitting layer 11 may be disposed on the side of the one surface 10A (that is, the indoor side), and the absorber-containing layer 12 may be disposed on the side of the other surface 10B (that is, the outdoor side). Due to such constitution, the difference in luminance between the indoor side and the outdoor side can be made large, enabling information to be difficult to see on the outdoor side. The excitation light from the excitation light source is incident on the light-emitting layer 11 without being absorbed by the absorber-containing layer 12, and therefore lowering of the emission intensity of the light-emitting layer 11 can be prevented even when the absorber-containing layer 12 is provided.

Respective components (such as the light-emitting material, the visible light absorber, and the ultraviolet ray absorber) contained in the light-emitting layer 11 and the absorber-containing layer 12 are usually dispersed in a uniform manner in each layer, but may be unevenly distributed.

For example, when the thermoplastic film 10 comprises a single layer of the light-emitting layer 11 comprising a light-emitting material, the content ratio of the light-emitting material may be adjusted in such a way as to be larger in the region on the side of the one surface 10A of the light-emitting layer 11 than in the region on the side of the other surface 10B, or, for example, may be adjusted in such a way that the content ratio changes gradually. On the other hand, the content ratio of the visible light absorber may be adjusted in such a way as to be larger in the region on the side of the other surface 10B of the light-emitting layer 11 than in the region on the side of the one surface 10A, or, for example, may be adjusted in such a way that the content ratio changes gradually. Similarly, the content ratio of the ultraviolet ray absorber may also be adjusted in such a way as to be larger in the region on the side of the other surface 10B of the light-emitting layer 11 than in the region on the side of the one surface 10A, or, for example, may be adjusted in such a way that the content ratio changes gradually.

When the light-emitting material, the visible light absorber, and the like are unevenly distributed in this way, as well as when the two layers of the light-emitting layer 11 and the absorber-containing layer 12 are provided, the difference in luminance between one surface and the other surface can be made large. In addition, excitation light incident from the one surface 10A is likely to irradiate the light-emitting material before being absorbed by the visible light absorber, the ultraviolet ray absorber, and the like, and therefore lowering of the emission intensity of the light-emitting layer 11 can be prevented.

The thermoplastic film of the present invention may be used by being laminated on a glass plate, and may be used by being laminated on, for example, one glass plate, but is preferably used as an interlayer film for laminated glass. The interlayer film for laminated glass, comprising a thermoplastic film, is disposed between two glass plates, and is used for bonding the two glass plates, as will be mentioned later, and thereby laminated glass comprising an interlayer film for glass and two glass plates can be made.

[Laminated Glass]

Laminated glass of the present invention comprises a first glass plate, a second glass plate, and a thermoplastic film disposed between the first glass plate and the second glass plate. In the laminated glass, the first glass plate and the second glass plate are bonded with the thermoplastic film. That is, the thermoplastic film is used as the interlayer film for laminated glass.

The laminated glass of the present invention comprises a light emitting material that emits light by irradiation with excitation light, and is such that when the laminated glass is irradiated, from one surface, with excitation light, which the light-emitting material is capable of absorbing, a difference between luminance A observed on the side of the one surface and luminance B observed on the side of the other surface, (A−B), is 5 cd/m² or more. The laminated glass of the present invention makes it easy to see information from one surface, and makes it difficult to see the information from the other surface by making the difference in luminance between one surface and the other surface large.

Further, the visible light transmittance Tv of the laminated glass of the present invention is, as described above, preferably 70% or more, more preferably 75% or more, still more preferably 80% or more, and still more preferably 85% or more in an application in which, for example, transparency is required. With respect to the visible light transmittance Tv of the laminated glass, the higher, the better from the viewpoint of the transparency of the thermoplastic film, but the visible light transmittance Tv of the laminated glass is practically 99% or less, and preferably 97% or less.

On the other hand, in an application in which privacy protectability or the like is required, and light shieldability is needed, the visible light transmittance Tv may be made low, and is, for example, 50% or less, preferably 45% or less, and more preferably 40% or less, and is, as described above, preferably 10% or more, more preferably 15% or more, and still more preferably 20% or more.

The glass plate which is used in the laminated glass may be any of inorganic glass and organic glass, but is preferably inorganic glass. Examples of the inorganic glass include, but not particularly limited to, clear glass, float plate glass, polished plate glass, figured glass, meshed plate glass, wired plate glass, and green glass.

As the organic glass, organic glass generally called resin glass is used, and examples thereof include, but not particularly limited to, organic glass formed from a resin such as polycarbonate, an acrylic resin, an acrylic copolymer resin, or a polyester.

The two glass plates may be constituted by the same types of materials, or may be constituted by different materials from each other. For example, one and the other may be organic glass and inorganic glass, respectively, but both of the two glass plates are preferably inorganic glass or organic glass.

The thickness of each glass plate is not particularly limited, but is, for example, about 0.1 to 15 mm, and preferably 0.5 to 5 mm. The thicknesses of respective glass plates may be the same as or different from each other, but are preferably the same.

In the laminated glass of the present invention, the above-described thermoplastic film of the present invention may be used as the thermoplastic film disposed between the first glass plate and the second glass plate. That is, the thermoplastic film such that when laminated glass is prepared using the thermoplastic film and the standard glass, and the laminated glass is irradiated, from one surface, with excitation light, which the light-emitting material is capable of absorbing, a difference between luminance A observed on the side of the one surface and luminance B observed on the side of the other surface, (A−B), is 5 cd/m² or more may be used.

When the above-described thermoplastic film 10 of the present invention is used for the laminated glass 20 of the present invention, the first and the second glass plates 21, 22 may be bonded with the thermoplastic film 10 interposed therebetween, as shown in FIGS. 1 to 3.

The first glass plate 21 is bonded to the one surface 10A of the thermoplastic film 10, and is thereby disposed on the indoor side (as for an automobile, the inner side of the car), and the second glass plate 22 is bonded to the other surface 10B, and is thereby disposed on the outdoor side (as for an automobile, the outer side of the car).

The thermoplastic film which is used for the laminated glass of the present invention (that is, the interlayer film for laminated glass) is not limited to the above-described thermoplastic film of the present invention, and may have some other constitution. For example, the thermoplastic film may be a film such that the film comprises the above-described light-emitting layer comprising a thermoplastic resin and a light-emitting material, but when laminated glass is prepared using the standard glass, and the laminated glass is irradiated, from one surface, with excitation light, which the light-emitting material is capable of absorbing, the difference between luminance A and luminance B, (A−B), is not 5 cd/m² or more, and the film does not comprise the above-described visible light absorber. In such a case, the thermoplastic film may comprise a single layer of the light-emitting layer, but an additional layer may further be laminated in an appropriate manner. As the additional layer, a thermoplastic resin layer may be used.

The thermoplastic resin layer is a layer not comprising the above-described light-emitting material and visible light absorber, but comprising a thermoplastic resin, and, if necessary, may comprise an ultraviolet ray absorber and other additives. The thermoplastic resin layer may have the constitution as described in light-emitting layer, except that the thermoplastic resin layer does not comprise a light-emitting material, and the specific contents thereof are as described above. The same applies to those mentioned simply as "the thermoplastic resin layer" in the following description.

Further, the thermoplastic film which is used for the laminated glass of the present invention (the interlayer film for laminated glass) may be a thermoplastic film not comprising a light-emitting layer but comprising an absorber-containing layer. Also in this case, the thermoplastic film may comprise a single layer of the absorber-containing layer, but an additional layer may further be laminated. As the additional layer, the thermoplastic resin layer may be used. Furthermore, the thermoplastic film which is used for the laminated glass of the present invention does not have to comprise both of the light-emitting layer and the absorber containing layer, and in such a case, the thermoplastic film may comprise the thermoplastic resin layer.

As just described, when the thermoplastic film which is used for the laminated glass (the interlayer film for laminated glass) does not have the above-described constitution of the thermoplastic film of the present invention, the laminated glass may comprise at least any one of the light-emitting layer and the absorber-containing layer as an additional member other than the thermoplastic film. When the light-emitting layer is provided as the additional member, the laminate glass can thereby be allowed to emit light even when the thermoplastic film does not comprise a light-emitting layer. In addition, when the absorber-containing layer is provided as the additional member, the difference in luminance between one surface and the other surface can thereby be made large even when the difference in luminance between one surface and the other surface cannot be made large by the thermoplastic film.

The light-emitting layer and the absorber-containing layer each provided as the additional member may each be, for example, a coat formed on any one of the surfaces of the first and the second glass plates.

The light-emitting layer comprising a coat is, for example, a coat comprising a light-emitting material, and if necessary, the coat may comprise a binder component comprising a thermosetting resin, a thermoplastic resin, or the like. As the binder component, specifically polyvinyl butyral and the like can be used. In the coat comprising a light-emitting material, the content of the light-emitting material based on the total amount of the coat is preferably 0.1% by mass or more, and more preferably 1% by mass or more, and is preferably 50% by mass or less, and more preferably 40% by mass or less. When the content of the light-emitting material is equal to or more than the lower limit value of these, the emission intensity of the laminated glass can be improved, and when the content of the light-emitting material is equal to or less than the upper limit value of these, the binder in a certain amount or more can thereby be contained, making the adhesiveness between the glass and the coat good.

The thickness of the coat comprising a light-emitting material is preferably 1 µm or more, more preferably 10 µm or more, and is preferably 300 µm or less, and more preferably 200 µm or less. When the thickness of the coat is equal to or more than the lower limit value of these, the emission intensity of the laminated glass can be improved, and when the thickness of the coat is equal to or less than the upper limit value of these, the visible light transmittance of the laminated glass can be increased.

Such a light-emitting layer can be formed by coating a glass plate with a paint comprising a light-emitting material, a binder component and a solvent which is blended as necessary, and, if necessary, conducting drying, curing, and the like. If necessary, an additive, such as an ultraviolet ray absorber, may be contained in the paint. As the solvent, for example, ethanol and toluene can be used.

The absorber-containing layer comprising a coat is, for example, a coat comprising a visible light absorber, and if necessary, the coat may comprise an ultraviolet ray absorber, or may comprise a binder component comprising a thermosetting resin, a thermoplastic resin, or the like. As the binder component, the binder components which are the same as used in the above-described light-emitting layer comprising a coat can be used. In the coat comprising a visible light absorber, the content of the visible light absorber based on the total amount of the coat is preferably 0.0001% by mass or more, and more preferably 0.005% by mass or more, and is preferably 30% by mass or less, and more preferably 20% by mass or less. When the content of the visible light absorber is equal to or more than the lower limit value of these, the difference in luminance between one surface and the other surface can be made large, making it difficult to see the information from the other surface. When the content of the visible light absorber is equal to or less than the upper limit value of these, the binder in a certain amount or more can thereby be contained, making the adhesiveness between the glass and the coat good.

The thickness of the coat comprising a visible light absorber is preferably 1 µm or more, and more preferably 10 µm or more, and is preferably 300 µm or less, and more preferably 200 µm or less. When the thickness of the coat is equal to or more than the lower limit value of these, the difference in luminance between one surface and the other surface can be made large, and when the thickness of the coat is equal to or less than the upper limit value of these, the visible light transmittance of the laminated glass can be increased.

Such a light-emitting layer can be formed by coating a glass plate with a paint comprising a visible light absorber, a binder component and a solvent which is blended as necessary, and, if necessary, conducting drying, curing, and the like. If necessary, an additive, such as an ultraviolet ray absorber, may be contained in the paint. As the solvent, the solvent which is used for forming the above-described light-emitting layer comprising a coat can be used.

When at least one of the light-emitting layer and the absorber-containing layer is provided as the additional member other than the thermoplastic film (the interlayer film for laminated glass), the laminated glass may comprise both of the light-emitting layer and the absorber-containing layer as a whole. For example, one of the light-emitting layer and the absorber-containing layer may be a coat formed on any one of the surfaces of the first and the second glass plates, and the other may be contained in the thermoplastic film (the interlayer film for laminated glass). The light-emitting layer may be disposed on the indoor side (as for an automobile, the inner side of the car) with respect to the absorber-containing layer.

Figure 4:
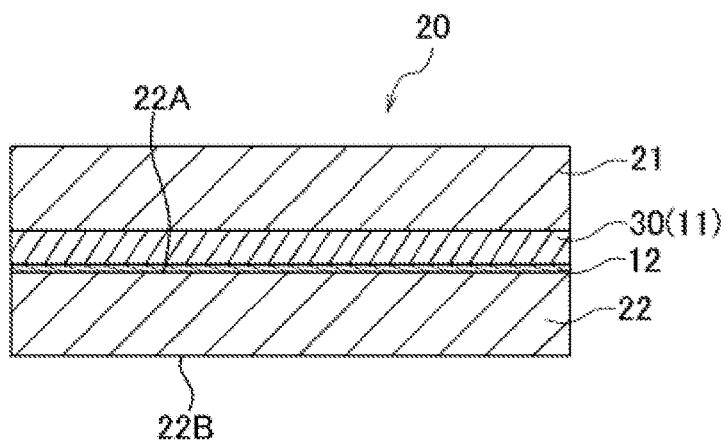
FIG. 4 is a sectional view showing a laminated glass of one embodiment of the present invention.
Figure 5:
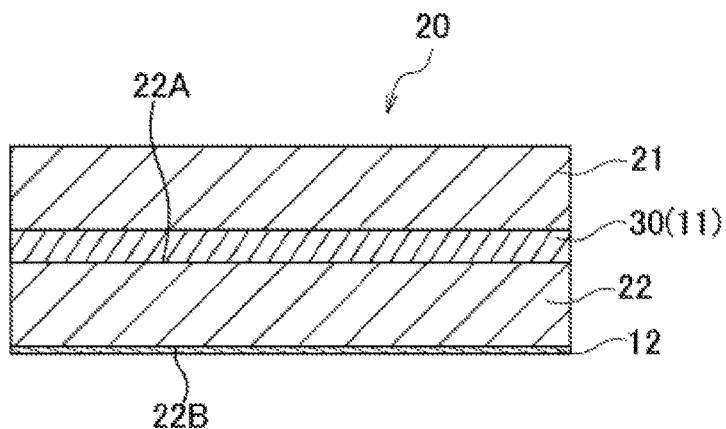
FIG. 5 is a sectional view showing a laminated glass of one embodiment of the present invention.

In more detail, for example, as shown in FIGS. 4 and 5, when a thermoplastic film 30 comprises the light-emitting layer 11, the absorber-containing layer 12 may be a coat formed on any one of surfaces 22A, 22B of the second glass plate 22. FIGS. 4 and 5 show an aspect such that the thermoplastic film 30 comprises a single layer of the light-emitting layer 11, but a layer other than the light-emitting layer 11 may be provided. Such a layer may be, for example, the thermoplastic resin layer.

Figure 6:
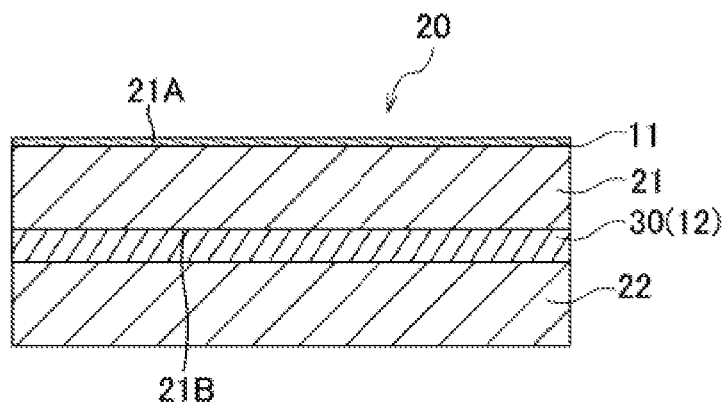
FIG. 6 is a sectional view showing a laminated glass of one embodiment of the present invention.
Figure 7:
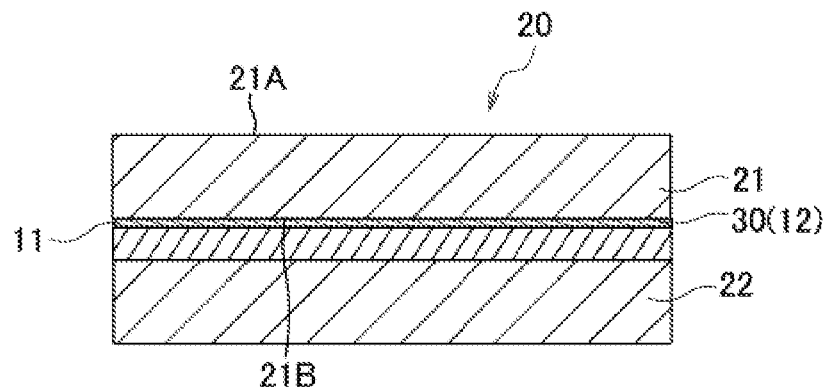
FIG. 7 is a sectional view showing a laminated glass of one embodiment of the present invention.

As shown in FIGS. 6 and 7, when the thermoplastic film 30 comprises the absorber-containing layer 12, the light-emitting layer 11 may be a coat formed on any one of surfaces 21A, 21B of the first glass plate 21. FIGS. 6 and 7 show an aspect such that the thermoplastic film 30 comprises a single layer of the absorber-containing layer 12, but a layer other than the absorber-containing layer 12 may be provided. Such a layer may be, for example, the above-described thermoplastic resin layer.

Further, although not shown, when the thermoplastic film 30 contains neither the light-emitting layer 11 nor the absorber-containing layer 12, the light-emitting layer 11 may be formed on any one of surfaces 21A, 21B of the first glass plate 21, and the absorber-containing layer 12 may be formed on any one of the surfaces 22A, 22B of the second glass plate 22.

In the laminated glass 20 above, the first glass plate 21 is disposed on the indoor side (as for an automobile, the inner side of the car), and the second glass plate 22 is disposed on the outdoor side (as for an automobile, the outer side of the car).

When the laminated glass of the present invention comprises both of the light-emitting layer and the absorber-containing layer, and the absorber-containing layer is disposed on the outdoor side, thereby the difference in luminance between one surface and the other surface can be made large, making the information based on the emission difficult to see from the outdoor side. In addition, by irradiating the laminated glass with excitation light from the indoor side, the light-emitting layer emits light with high emission efficiency by the excitation light.
(Application of Laminated Glass)

The laminated glass of the present invention is used as, for example, window glass, and more specifically may be used for window glass of various vehicles, such as an automobile, a train, a ship, and an airplane, and various buildings, such as an office building, an apartment, a single house, a hall, and a gymnasium, and the like. The window glass is disposed at, for example, external surfaces of various buildings, and external surfaces of various vehicles, and light from outside may be incident from the outdoor side toward the indoor side through the window glass.

The laminated glass is preferably used for window glass of a vehicle, and particularly for window glass for an automobile. When the above-described first glass plate is irradiated with excitation light from the indoor side (as for an automobile, the inner side of the car), the laminated glass can thereby display various images by the emission from the light-emitting layer. In addition, the display of an image is made difficult to see from the second glass plate.

The window glass for an automobile may be any of a windshield, rear glass, side glass, and roof glass, but is preferably used for a windshield. When the laminated glass comprising a light-emitting layer is used for a windshield, the laminated glass can suitably be used for a HUD application.

The present invention also provides an image display system comprising the above-described laminated glass and a light source. As described above, the laminated glass may be window glass, the first glass plate is disposed on the indoor side (as for an automobile, the inner side of the car), and the second glass plate is disposed on the outdoor side (as for an automobile, the outer side of the car). The light source is not particularly limited as long as it emits excitation light capable of exciting the light-emitting material contained in the laminated glass, and a laser light source, an LED light source, a xenon lamp, or the like is used. The light source may be disposed indoors (as for an automobile, inside the car), and the first glass plate may thereby be irradiated with excitation light from the light source. When the laminated glass is irradiated with excitation light from the light source, the light-emitting material in the laminated glass emits light, and an image is displayed in the laminated glass.

When the laminated glass is made into a windshield of an automobile, the image display system of the present invention can suitably be used as HUD of an automobile.
(Production Method)

The light-emitting layer may be formed with, for example, a thermoplastic resin composition comprising materials that constitute the light-emitting layer, such as a thermoplastic resin, a light-emitting material, and a plasticizer, an ultraviolet ray absorber, and other additives, which are added as necessary. The absorber-containing layer may be formed with, for example, a thermoplastic resin composition comprising materials that constitute the absorber-containing layer, such as a thermoplastic resin, a visible light absorber, and a plasticizer, and other additives, which are added as necessary.

In the present invention, the light-emitting layer and the absorber-containing layer may be prepared by subjecting the thermoplastic resin compositions obtained by kneading the materials that constitute respective layers to extrusion shaping, press molding, or the like.

When the thermoplastic film of the present invention comprises, for example, a single layer of the light-emitting layer, the light-emitting layer prepared in the manner as described above may be used as the thermoplastic film. When the thermoplastic film of the present invention comprises a multi-layered structure of two layers or more, the thermoplastic film can be produced by laminating respective layers (for example, the light-emitting layer, the barrier layer, and the absorber-containing layer) that constitute the thermoplastic film, and then conducting thermocompression bonding or the like.

The laminated glass can also be produced in a similar manner, and can be produced by laminating respective layers that constitute the thermoplastic film between two glass plates, and then conducting thermocompression bonding or the like. In this case, when a coat that constitutes the light-emitting layer or the absorber-containing layer is formed on the surface of the glass plate, the coat may be formed on the surface of the glass plate in advance before the thermoplastic film is bonded to the glass plate.

EXAMPLES

The present invention will be described in more detail with reference to Examples, but the present invention is not limited at all by these Examples.
[Transmittance of Laminated Glass]

The visible light transmittance (Tv) of laminated glass was measured in accordance with JIS R 3211(1998) using a spectrophotometer ("U-4100" manufactured by Hitachi High-Tech Corporation).
[Evaluation of Luminance]

In a dark room, High Power Xenon Light Source ("REX-250" manufactured by Asahi Spectra Co., Ltd., irradiation wavelength 405 nm) in which the quantity of light was adjusted to 90% was disposed at a position, in the direction vertical to the surface of the first glass plate of resultant laminated glass, 10 cm away from the surface, and the whole surface of the laminated glass was irradiated with light having an intensity of 7 mW/cm$^2$. Luminance A (cd/m$^2$) was measured with a luminance meter ("SR-3AR" manufactured by TOPCON TECHNOHOUSE CORPORATION) which was disposed at an angle of 45° from the surface of the first glass plate and at a position where the shortest distance from the surface of the first glass plate was 35 cm. Luminance B (cd/m$^2$) was measured with a luminance meter ("SR-3AR" manufactured by TOPCON TECHNOHOUSE CORPORATION) which was disposed at an angle of 45° from the surface of the second glass plate and at a position where the shortest distance from the surface of the second glass plate was 35 cm. Luminance A-Luminance B was determined, and evaluated according to the following criteria.

Good . . . Luminance A-Luminance B is 5 (cd/m$^2$) or more
Poor . . . Luminance A-Luminance B is less than 5 (cd/m$^2$)

In Examples and Comparative Example, the following components and materials were used.
(Resin)
PVB: polyvinyl butyral resin, degree of acetalization 69 mol %, amount of hydroxy group 30 mol %, degree of acetylation 1 mol %, degree of polymerization 1700
(Plasticizer)
3GO: triethylene glycol di-2-ethylhexanoate
(Light-Emitting Material)
Terephthalic acid ester: diethyl-2,5-dihydroxyterephthalate
quinoline: 2-(3-oxoindolin-1-ylidene)methylquinoline
(Ultraviolet Ray Absorber)

Benzotriazole: a compound represented by the formula (13), wherein X represents a chlorine atom, $R^{31}$ represents a methyl group, and $R^{32}$ represents a tert-butyl group. Trade name "Tinuvin 326," manufactured by Ciba Specialty Chemicals, Inc., maximum absorption wavelength peak 353 nm (Visible Light Absorber)

Phthalocyanine compound: (chlorophthalocyaninato)copper (II)

Perylene dye: N,N'-bis(3,5-dimethylphenyl)perylene-3,4:9,10-bis(dicarboimide)

Black pigment: carbon black, Pigment Black 1 (P.BLA.1)

Anthraquinone dye: Pigment Blue 60 (P.B60), 6,15-dihydrodinaphtho[2,3-a:2,3-h]phenazine-5,9,14,18-tetraone Anthraquinone dye: Solvent Red (S.R.146), 1-amino-4-hydroxy-2-phenoxy-9,10-anthraquinone

Example 1

(Preparation of Light-Emitting Layer)

The polyvinyl butyral resin, the plasticizer, the light-emitting material, and the ultraviolet ray absorber were mixed according to combination shown in Table 1, and a resultant thermoplastic resin composition was extrusion-molded with a twin-screw anisotropic extruder to prepare a light-emitting layer having a thickness of 760 μm.

(Preparation of Absorber-Containing Layer)

The polyvinyl butyral resin, the plasticizer, the visible light absorber, and the ultraviolet ray absorber were mixed according to combination shown in Table 1, and a resultant thermoplastic resin composition was extrusion-molded with a twin-screw anisotropic extruder to prepare an absorber-containing layer having a thickness of 760 μm.

(Preparation of Laminated Glass)

The resultant light-emitting layer and absorber-containing layer were retained under a constant temperature and humidity condition of 23° C. and a relative humidity of 28% for 4 hours. Thereafter, two transparent clear glass plates (50 mm in length×50 mm in width×2.5 mm in thickness, visible light transmittance 90.4%) were prepared, and on one of the clear glass plates, the light-emitting layer, the absorber-containing layer, and the other clear glass plate were stacked in the mentioned order, thereby making a laminated body. The resultant laminated body was transferred into a rubber bag, the rubber bag was connected to a suction depressurization system to heat the rubber bag at an outside air heating temperature and simultaneously retain the rubber bag under a reduced pressure of −600 mmHg (absolute pressure 160 mmHg) for 10 minutes in such a way that the temperature (preliminary compression-bonding temperature) of the laminated body reached 60° C., and thereafter the pressure was returned to the atmospheric pressure to conduct temporary compression bonding. After the laminated body, which was temporarily compression-bonded, was retained in an autoclave under a condition of a temperature of 140° C. and a pressure of 1.3 MPa for 10 minutes, the temperature was decreased to 50° C., and the pressure was returned to the atmospheric pressure, thereby completing the main compression bonding, and thus laminated glass was obtained. The laminated glass comprised layer constitution of first glass plate/light-emitting layer/absorber-containing layer/second glass plate.

Examples 2 to 5

Laminated glass was obtained in the same manner as in Example 1, except that the combination of the light-emitting layer and absorber-containing layer was changed as shown in Table 1.

Comparative Example 1

A laminated glass was obtained in the same manner as in Example 1, except that the visible light absorber was not used in the absorber-containing layer.

TABLE 1

| | | | Example 1 | Example 2 | Example 3 | Example 4 | Example 5 | Comparative Example 1 |
|---|---|---|---|---|---|---|---|---|
| First glass plate | | | 2.5 mm Clear glass | 2.5 mm Clear glass | 2.5 mm Clear glass | 2.5 mm Clear glass | 2.5 mm Clear glass | 2.5 mm Clear glass |
| Light-emitting layer (inner side of car) | Resin | Type | PVB | PVB | PVB | PVB | PVB | PVB |
| | | Parts by mass | 100 | 100 | 100 | 100 | 100 | 100 |
| | Plasticizer | Type | 3 GO | 3 GO | 3 GO | 3 GO | 3 GO | 3 GO |
| | | Parts by mass | 40 | 40 | 40 | 40 | 40 | 40 |
| | Light-emitting material | Type | Terephthalic acid ester | Terephthalic acid ester | Terephthalic acid ester | 2-(3-Oxoindolin-1-ylidene)methylquinoline | Terephthalic acid ester | Terephthalic acid ester |
| | | Parts by mass | 0.56 | 0.56 | 0.56 | 0.56 | 0.56 | 0.56 |
| | Ultraviolet ray absorber | Type | Benzotriazole | Benzotriazole | Benzotriazole | Benzotriazole | Benzotriazole | Benzotriazole |
| | | Parts by mass | 0.2 | 0.2 | 0.2 | 0.2 | 0.2 | 0.2 |
| Absorber-containing layer (outer side of car) | Resin | Type | PVB | PVB | PVB | PVB | PVB | PVB |
| | | Parts by mass | 100 | 100 | 100 | 100 | 100 | 100 |
| | Plasticizer | Type | 3 GO | 3 GO | 3 GO | 3 GO | 3 GO | 3 GO |
| | | Parts by mass | 40 | 40 | 40 | 40 | 40 | 40 |
| | Visible light absorber | Type | (Chlorophthalocyaninato)copper (II)/carbon black/perylene dye (*1) | (Chlorophthalocyaninato)copper (II)/carbon black/perylene dye (*1) | P.BLA.1/ S.R.146/ P.B.60 | P.BLA.1/ S.R.146/ P.B.60 | P.BLA.1/ S.R.146/ P.B.60 | — |
| | | Parts by mass | 0.06/ 0.15/ 0.01 | 0.02/ 0.05/ 0.003 | 0.0007/ 0.00039/ 0.00055 | 0.0009/ 0.0005/ 0.0007 | 0.0009/ 0.0005/ 0.0007 | — |

TABLE 1-continued

|  |  |  | Example 1 | Example 2 | Example 3 | Example 4 | Example 5 | Comparative Example 1 |
|---|---|---|---|---|---|---|---|---|
|  | Ultraviolet ray absorber | Type | Benzotriazole | Benzotriazole | Benzotriazole | Benzotriazole | Benzotriazole | Benzotriazole |
|  |  | Parts by mass | 0.4 | 0.4 | 0.4 | 0.4 | 0.4 | 0.2 |
| Second glass plate |  |  | 2.5 mm Clear glass | 2.5 mm Clear glass | 2.5 mm Clear glass | 2.5 mm Clear glass | 2.5 mm Clear glass | 2.5 mm Clear glass |
| Laminated glass | Visible light transmittance | % | 18.2 | 57.1 | 87.1 | 83.8 | 83.8 | 88.4 |
| Results | Luminance | Luminance A (light source side) | 290 | 290 | 290 | 1180 | 290 | 290 |
|  |  | Luminance B (opposite side) | 1 | 194 | 280 | 1139 | 250 | 288 |
|  |  | A − B | 289 | 96 | 10 | 41 | 40 | 2 |
|  |  | Determination | Good | Good | Good | Good | Good | Poor |

(*1) N,N'-Bis(3,5-dimethylphenyl)perylene-3,4,9,10-bis(dicarboimide)

It was found that the laminated glass prepared using the thermoplastic film of the present invention has a difference between luminance A observed on the side of one surface and luminance B observed on the side of the other surface, (A−B), of 5 cd/m$^2$ or more, and can make it easy to see the information displayed in the laminated glass from the side of one surface, and can make it difficult to see the information from the side of the other surface.

REFERENCE SIGNS LIST 10, 30 Thermoplastic film
11 Light-emitting layer
12 Absorber-containing layer
13 Barrier layer
20 Laminated glass
21 First glass plate
22 Second glass plate

The invention claimed is:

1. A thermoplastic film comprising a light-emitting layer, the light-emitting layer comprising:
a thermoplastic resin; and
a light-emitting material that emits light by being irradiated with excitation light, and
when a laminated glass obtained by bonding two sheets of clear glass in accordance with JIS R 3211(1998) having a thickness of 2.5 mm with the thermoplastic film interposed therebetween is irradiated, from one surface, with excitation light, which the light-emitting material is capable of absorbing, in a quantity of light of 7 mW/cm$^2$, a difference between luminance A observed on a side of the one surface and luminance B observed on a side of the other surface, (A−B), is 5 cd/m$^2$ or more.

2. The thermoplastic film according to claim 1, comprising a visible light absorber.

3. The thermoplastic film according to claim 2, further comprising an absorber-containing layer being a layer different from the light-emitting layer and comprising the visible light absorber.

4. The thermoplastic film according to claim 3, further comprising a barrier layer between the light-emitting layer and the absorber-containing layer.

5. The thermoplastic film according to claim 1, further comprising an ultraviolet ray absorber.

6. The thermoplastic film according to claim 5, wherein the ultraviolet ray absorber is contained in the absorber-containing layer.

7. The thermoplastic film according to claim 1, wherein a visible light transmittance Tv as measured for the laminated glass obtained by bonding two sheets of clear glass in accordance with JIS R 3211(1998) having a thickness of 2.5 mm with the thermoplastic film interposed therebetween is 70% or more.

8. The thermoplastic film according to claim 1, being an interlayer film for laminated glass.

9. A laminated glass comprising:
an interlayer film for laminated glass, comprising the thermoplastic film according to claim 8; and
two glass plates, wherein
the interlayer film for laminated glass is disposed between the two glass plates.

10. An image display system comprising:
the laminated glass according to claim 9; and
a light source.

11. A laminated glass comprising:
a first glass plate;
a second glass plate; and
a thermoplastic film disposed between the first glass plate and the second glass plate, wherein
the laminated glass comprises a light-emitting material that emits light by irradiation with excitation light, and
when the laminated glass is irradiated, from one surface, with excitation light, which the light-emitting material is capable of absorbing, a difference between luminance A observed on a side of the one surface and luminance B observed on a side of the other surface, (A−B), is 5 cd/m$^2$ or more.

12. The laminated glass according to claim 11, wherein a coat comprising a visible light absorber is formed on at least one surface of the second glass plate.

* * * * *